US012674708B2

(12) United States Patent
Ishibashi et al.

(10) Patent No.: US 12,674,708 B2
(45) Date of Patent: Jul. 7, 2026

(54) DETECTION SENSOR

(71) Applicant: HOSIDEN CORPORATION, Yao (JP)

(72) Inventors: Shingo Ishibashi, Yao (JP); Hiroyuki Harano, Yao (JP); Ryuji Awamura, Yao (JP); Kensuke Nakanishi, Yao (JP)

(73) Assignee: HOSIDEN CORPORATION, Yao (JP)

( * ) Notice: Subject to any disclaimer, the term of this patent is extended or adjusted under 35 U.S.C. 154(b) by 202 days.

(21) Appl. No.: 18/799,011

(22) Filed: Aug. 9, 2024

(65) Prior Publication Data

US 2025/0085167 A1 Mar. 13, 2025

(30) Foreign Application Priority Data

Sep. 7, 2023 (JP) ................................ 2023-145364

(51) Int. Cl.
*G01J 5/34* (2022.01)
*G01H 11/08* (2006.01)
(52) U.S. Cl.
CPC ................ *G01J 5/34* (2013.01); *G01H 11/08* (2013.01)
(58) Field of Classification Search
CPC . G01H 11/08; G01J 5/34; G01J 5/045; G01D 11/24; G01D 5/14; H04R 17/025
See application file for complete search history.

(56) References Cited

U.S. PATENT DOCUMENTS

| | | | |
|---|---|---|---|
| 4,258,260 A | 3/1981 | Obara et al. | |
| 11,788,881 B2 * | 10/2023 | Matsushita | G01H 11/08 |
| | | | 73/658 |

| | | | |
|---|---|---|---|
| 2008/0068143 A1 | 3/2008 | Sugiura | |
| 2014/0354905 A1 | 12/2014 | Kitchens et al. | |
| 2015/0053859 A1 | 2/2015 | Saito | |

(Continued)

FOREIGN PATENT DOCUMENTS

| | | |
|---|---|---|
| JP | S54-046525 U | 4/1979 |
| JP | S56-48189 Y2 | 5/1984 |

(Continued)

OTHER PUBLICATIONS

Office Action dated Oct. 16, 2024, from China National Intellectual Property Administration, for CN 202110967929.1, with translation (15 pages total).

*Primary Examiner* — Jurie Yun
(74) *Attorney, Agent, or Firm* — Kilyk & Bowersox, P.L.L.C.

(57) ABSTRACT

A detection sensor including a sensor unit and a holder. The unit includes a vibratable film and a case. The case accommodates the film and includes an opening disposed on one side in a first direction relative to the film. The holder includes a holding portion holding the unit, a front portion disposed on the one side in the first direction relative to the case, a transmissive part, a sound hole for sound-wave input, and a sound path extending from the sound hole to the opening. The transmissive part is configured to transmit at least infrared rays, provided at the front portion, disposed on the one side in the first direction relative to the opening and the film, and opposed to the film. The sound hole is provided in a portion around the transmissive part of the front portion and open to the one side in the first direction.

20 Claims, 15 Drawing Sheets

(56) References Cited

U.S. PATENT DOCUMENTS

| | | | |
|---|---|---|---|
| 2021/0051413 | A1 | 2/2021 | Hui et al. |
| 2022/0065691 | A1 | 3/2022 | Matsushita et al. |

FOREIGN PATENT DOCUMENTS

| | | | |
|---|---|---|---|
| JP | 2016099137 | A | 5/2016 |
| JP | 2022-42578 | A | 3/2022 |
| WO | 2011159003 | A | 12/2011 |

* cited by examiner

D

DETECTION SENSOR

CROSS-REFERENCE TO RELATED APPLICATION

The present application claims priority under 35 U.S.C. § 119 of Japanese Patent Application No. 2023-145364 filed on Sep. 7, 2023, the disclosure of which is expressly incorporated by reference herein in its entirety.

BACKGROUND OF THE INVENTION

Technical Field

The invention relates to detection sensors.

Background Art

Japanese patent application No. 2020-148018 (Patent publication No. JP 2022-42578 A) describes a conventional, first detection sensor. The first detection sensor includes a vibratable film constituted by a piezoelectric film, a case accommodating the vibratable film, and a circuit board. The vibratable film is configured to be irradiated with infrared rays and thereby generate first electric signals through a pyroelectric effect, and configured to be vibrated by sound waves and thereby generate second electric signals through a piezoelectric effect. The case includes a transmissive part configured to transmit at least infrared rays. The transmissive part is disposed on one side in a first direction relative to the vibratable film to face the vibratable film. The first direction is a thickness direction of the vibratable film. The circuit board is fixed to the case and disposed on the other side in the first direction relative to the vibratable film. The circuit board has a sound hole to input therethrough sound waves.

The first detection sensor is configured such that infrared rays are incident on the transmissive part from the one side in the first direction while sound waves are inputted into the sound hole from the other side in the first direction. In other words, the first detection sensor is incapable of receiving input of infrared ray and input of sound wave from the same direction.

Utility mode publication No. JP S54-046525 U describes a conventional, second detection sensor. The second detection sensor includes a shield case, an electrically conductive support, and a piezoelectric polymer film. The shield case has an opening open to one side in a first direction. The support is securely accommodated inside the shield case and disposed on the other side in the first direction relative to the opening. The piezoelectric polymer film is supported on the support and disposed on the other side in the first direction relative to the opening. The piezoelectric polymer film is exposed from the opening to the one side in the first direction. As such, the piezoelectric polymer film is irradiated with infrared rays from the one side in the first direction through the opening and generate signals through a pyroelectric effect, and also vibrated by sound waves inputted from the one side in the first direction through the opening and thereby generate a signal.

SUMMARY OF INVENTION

In the second detection sensor, since the piezoelectric polymer film is exposed from the opening, there is a possibility that dust, dirt, water, and the like adhere to the piezoelectric polymer film.

The invention provides a detection sensor that can receive input of infrared rays and input of sound waves from the same direction and does not expose a vibratable film to outside.

A detection sensor according to one aspect of the invention includes a sensor unit and a holder. The sensor unit includes a vibratable film constituted by a piezoelectric film and a case accommodating the vibratable film. The vibratable film is configured to be irradiated with infrared rays and thereby generate first electric signals through a pyroelectric effect, and configured to be vibrated by sound waves and thereby generate second electric signals through a piezoelectric effect. The case includes an opening disposed on one side in a first direction relative to the vibratable film. The first direction is a thickness direction of the vibratable film. The holder includes a holding portion holding the sensor unit, a front portion disposed on the one side in the first direction relative to the case, a transmissive part configured to transmit at least infrared rays, a sound hole to input therethrough sound waves, and a sound path. The transmissive part is provided at the front portion, exposed from the front portion to the one side and the other side in the first direction, disposed on the one side in the first direction relative to the opening and the vibratable film, and opposed to the vibratable film. The sound hole is provided in a portion around the transmissive part of the front portion and open to the one side in the first direction. The sound path extends from the sound hole to the opening of the case.

The detection sensor of the above aspect can receive input of infrared ray and input of sound waves from the same direction for the following reasons. The front portion of the holder is disposed on the one side in the first direction relative to the case of the sensor unit. The transmissive part of the holder is provided at the front portion of the holder, exposed from the front portion to the one side and the other side in the first direction, disposed on the one side in the first direction relative to the opening and the vibratable film of the sensor unit, and opposed to the vibratable film. This arrangement allows at least infrared rays to transmit through the transmissive part from the one side in the first direction and be projected onto the vibratable film of the sensor unit. In addition, since the sound hole is provided in the portion around the transmissive part of the front portion and the sound path extends from the sound hole to the opening of the case, sound waves can also enter into the sound hole from the one side in the first direction, pass through the sound hole, the sound path, and the opening, and vibrate the vibratable film. Moreover, since the transmissive part of the holder is provided at the front portion of the holder and opposed to the vibratable film while the sound hole is provided in the portion around the transmissive part of the front portion, the vibratable film is not exposed to outside of the detection sensor through the sound hole, the sound path, or the opening.

Figure 1A:
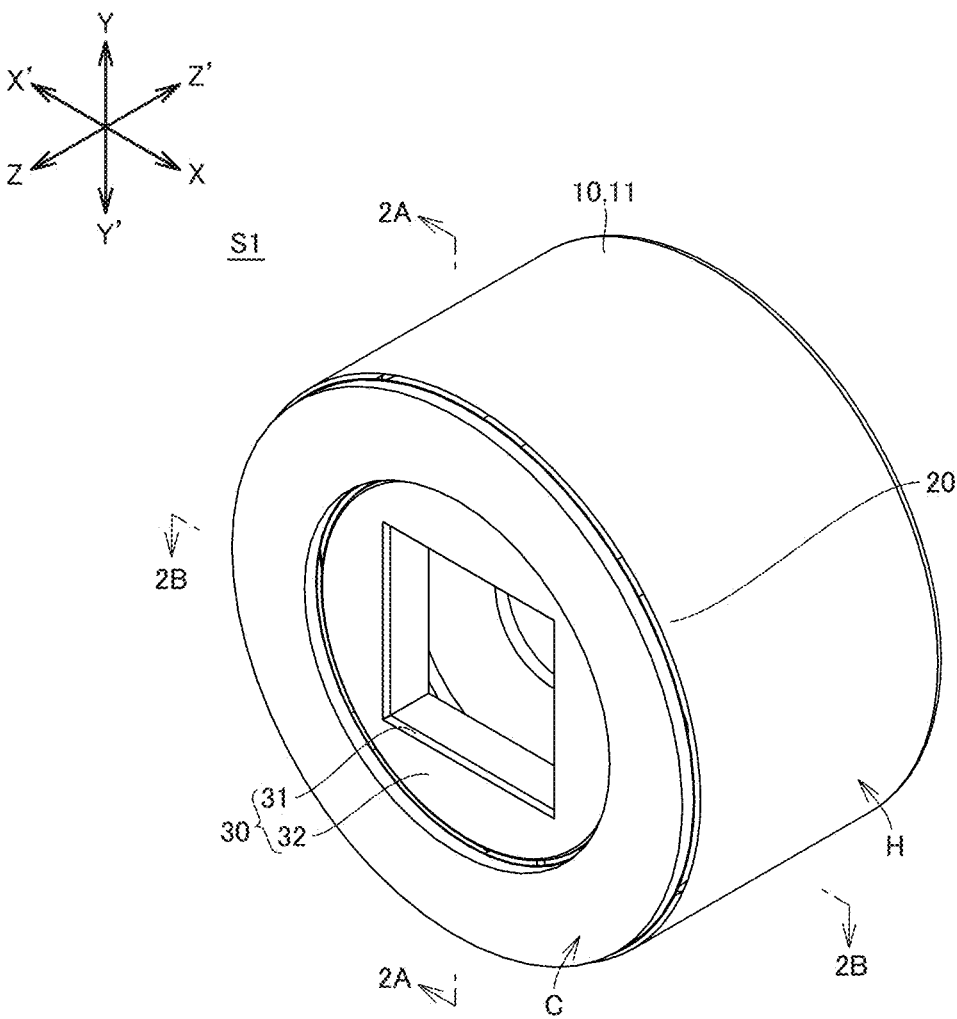
FIG. 1A is a front, top, right side perspective view of a detection sensor according to a first embodiment of the invention.
Figure 1B:
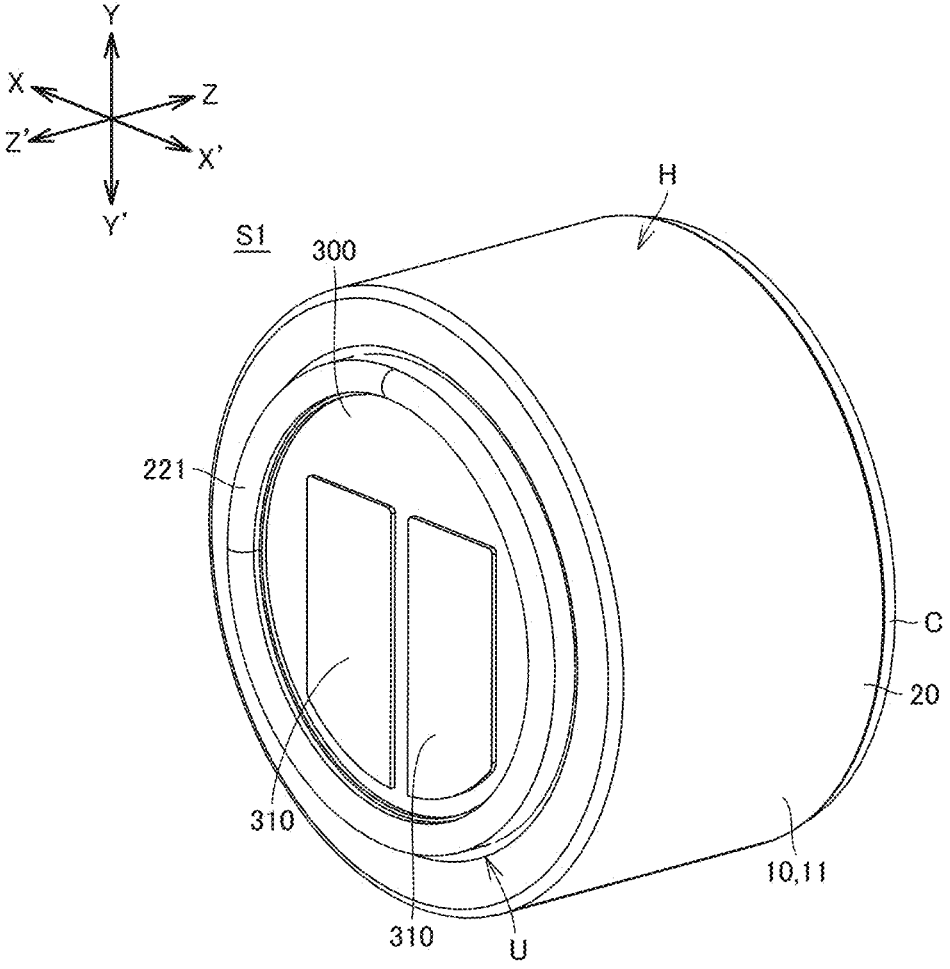
FIG. 1B is a rear, top, left side perspective view of the detection sensor of the first embodiment.
Figure 2A:
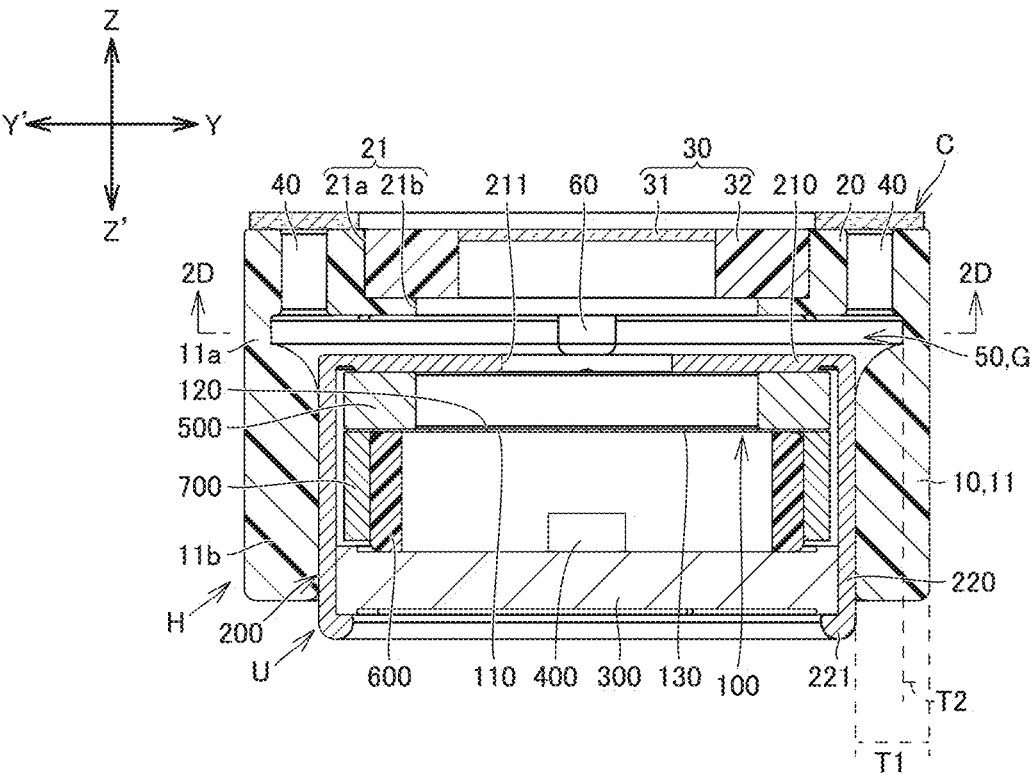
FIG. 2A is a cross-sectional view of the detection sensor of the first embodiment taken along line 2A-2A in FIG. 1A.
Figure 2B:
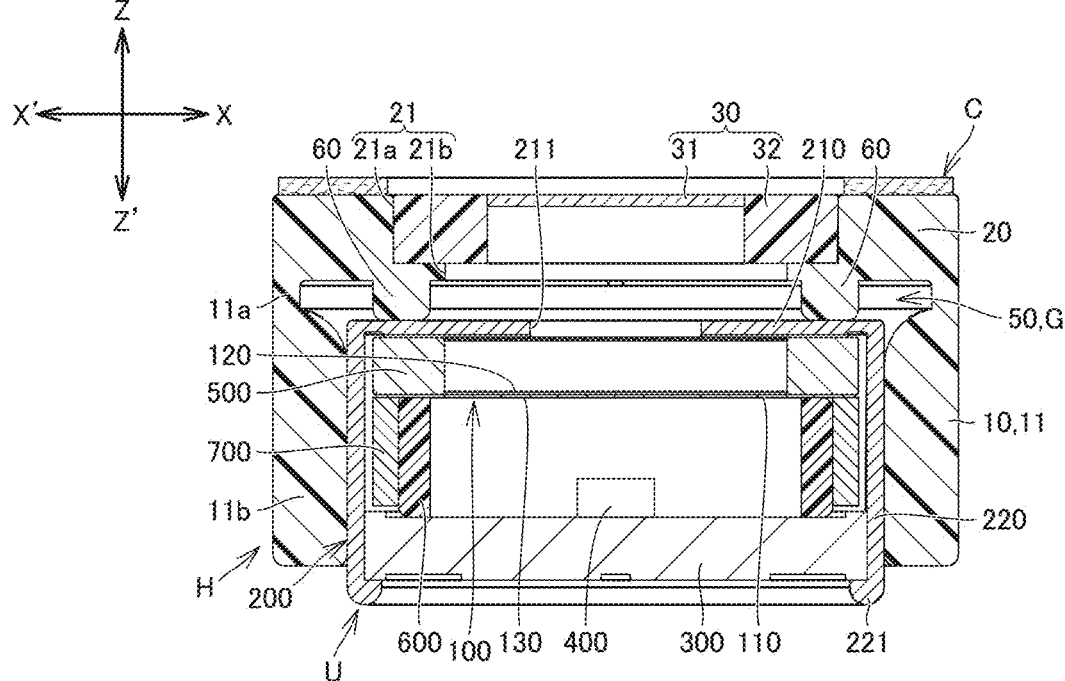
FIG. 2B is a cross-sectional view of the detection sensor of the first embodiment taken along line 2B-2B in FIG. 1A.
Figure 2C:
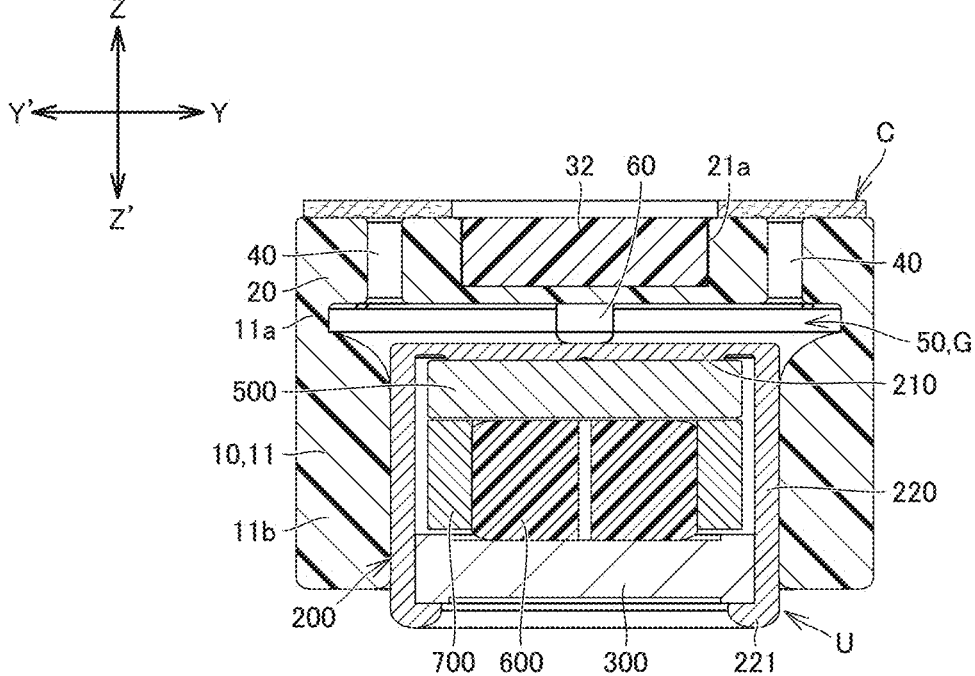
FIG. 2C is a cross-sectional view of the detection sensor of the first embodiment taken along line 2C-2C in FIG. 2D.
Figure 2D:
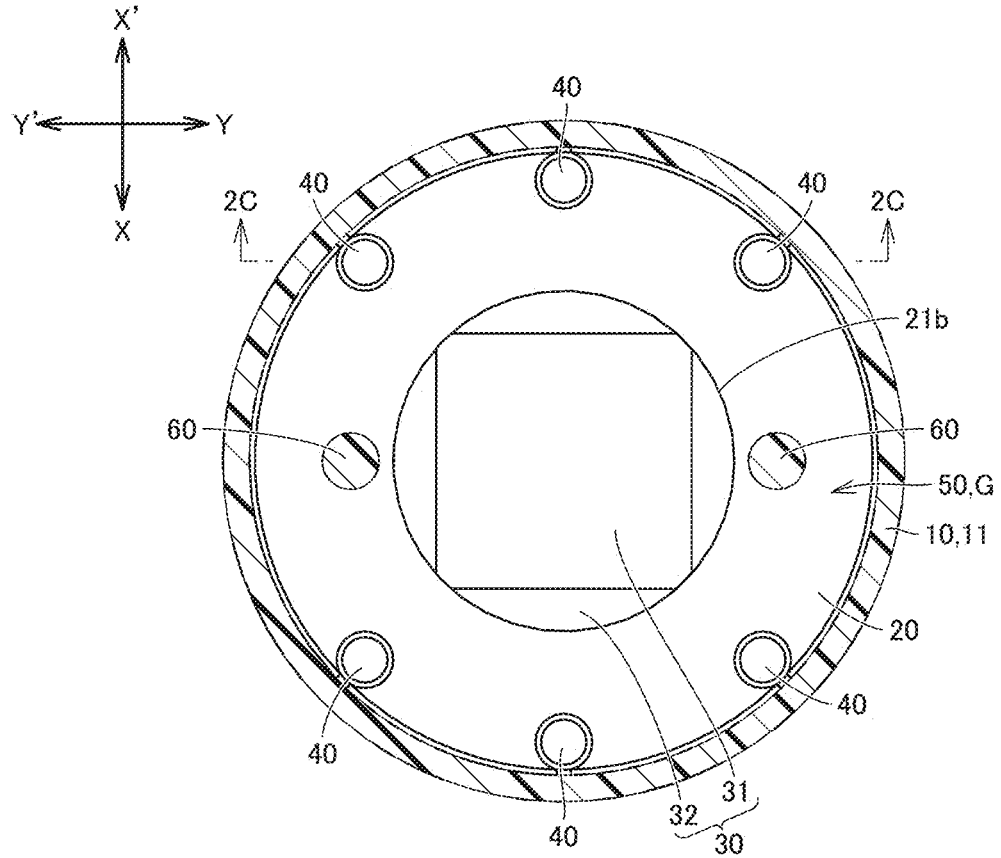
FIG. 2D is a cross-sectional view of the detection sensor of the first embodiment taken along line 2D-2D in FIG. 2A.
Figure 3A:
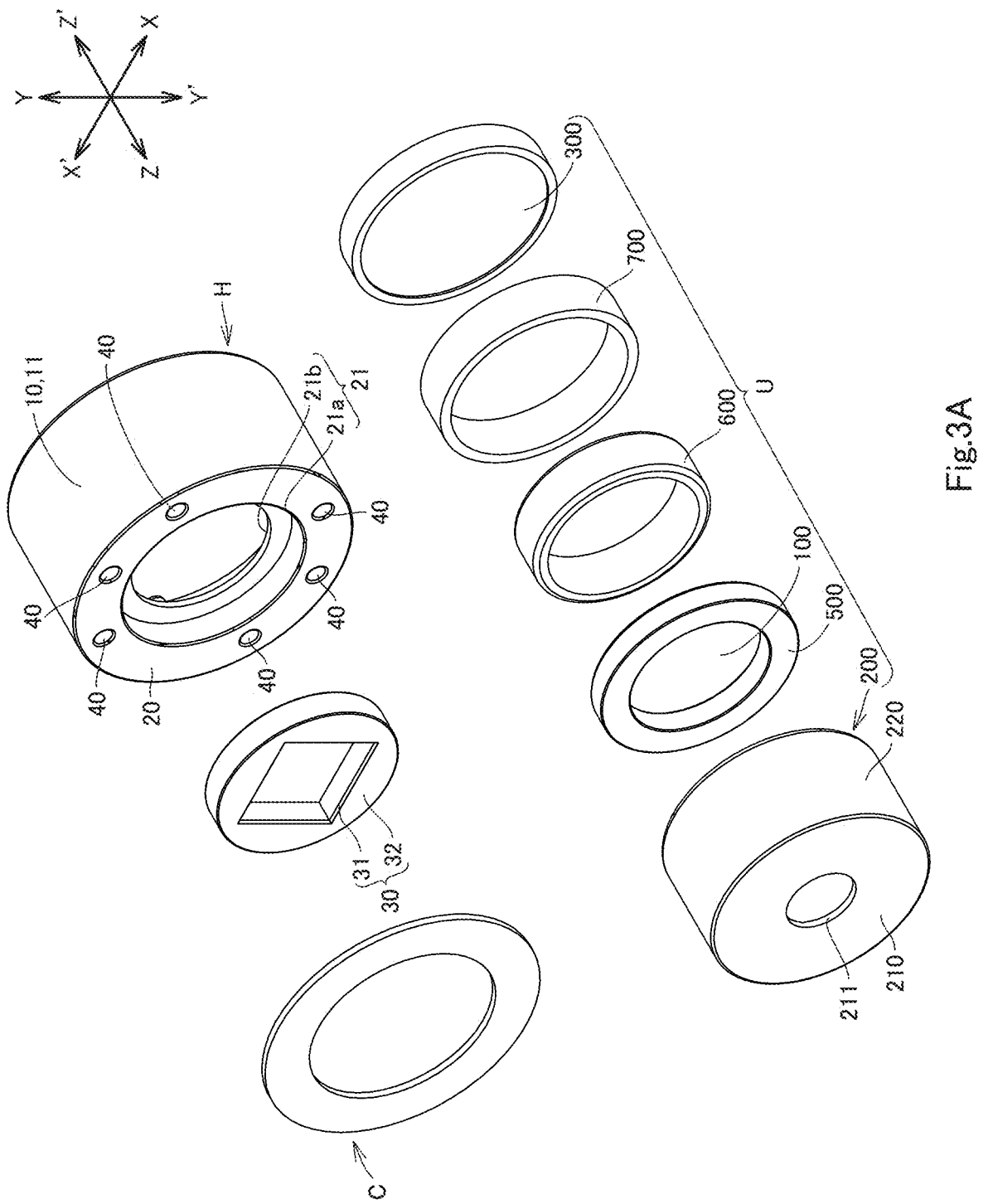
FIG. 3A is a front, top, right side perspective, exploded view of the detection sensor of the first embodiment.
Figure 3B:
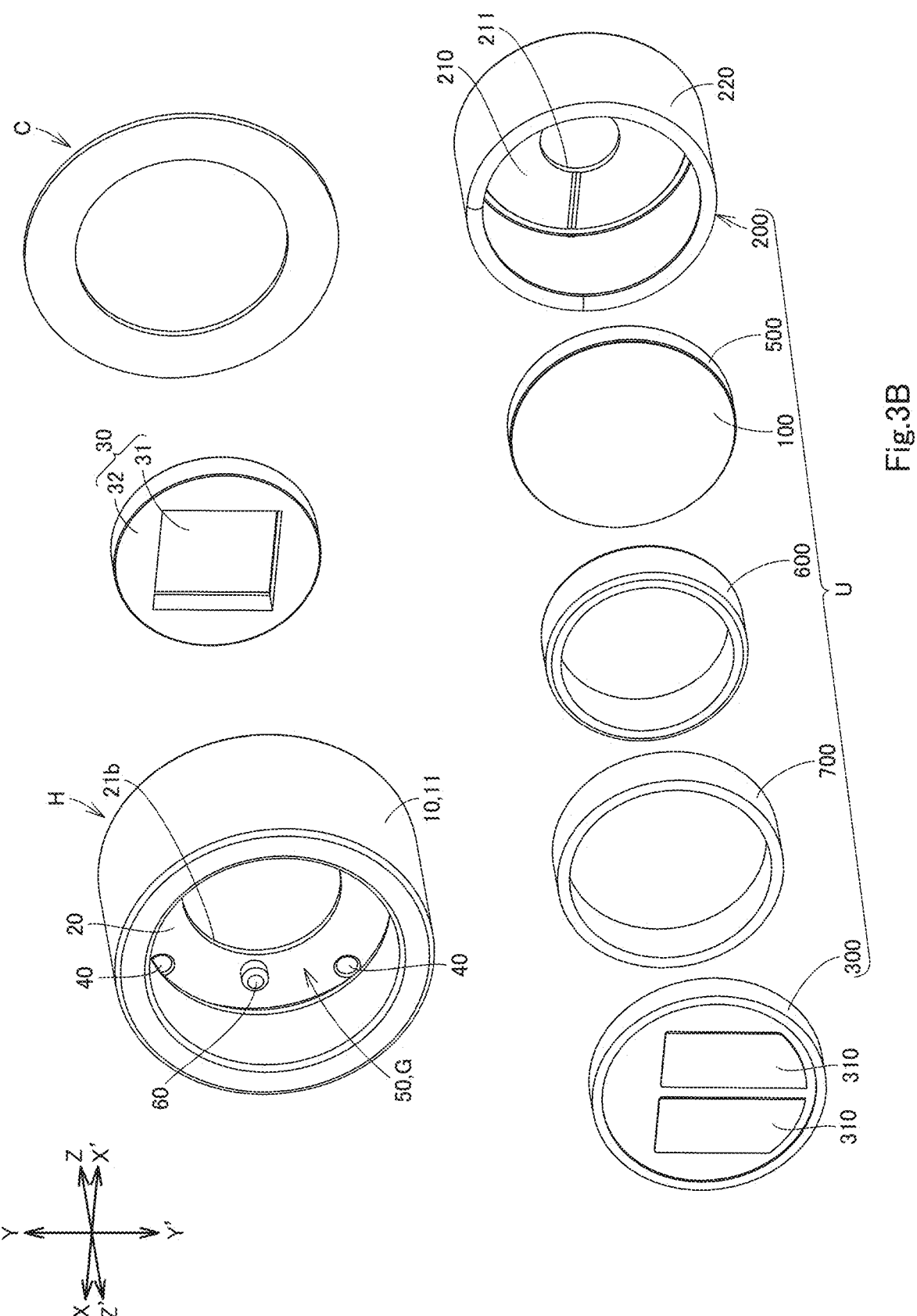
FIG. 3B is a rear, top, left side perspective, exploded view of the detection sensor of the first embodiment.

In the brief description of the drawings above and the description of embodiments which follows, relative spatial terms such as "upper", "lower", "top", "bottom", "left", "right", "front", "rear", etc., are used for the convenience of the skilled reader and refer to the orientations of the detection sensors and their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

A plurality of embodiments of the invention, including first to third embodiments and variants thereof, will now be described. It should be noted that constituents of the embodiments and their variants to be described can be combined in any possible manner. It should also be noted that the materials, the shapes, the dimensions, the numbers, the arrangements, etc. of the constituents of the embodiments and their variants to be described are presented by way of example only and can be modified in any manner as long as the same functions can be fulfilled.

First Embodiment

A detection sensor S1 according to a plurality of embodiments of the invention, including a first embodiment and variants thereof, will now be described with reference to FIGS. 1A to 3B. FIGS. 1A to 3B illustrate the detection sensor S1 of the first embodiment. FIGS. 1A to 2C, 3A, and 3B show a Z-Z' direction (first direction). The Z-Z' direction includes a Z direction (one side in the first direction) and a Z' direction (the other side in the first direction). FIGS. 1A to 2A and 2C to 3B show a Y-Y' direction (second direction). The Y-Y' direction is substantially orthogonal to the Z-Z' direction and includes a Y direction (one side in the second direction) and a Y' direction (the other side in the second direction). FIGS. 1A, 1B, 2B, 2D, 3A, and 3B show an X-X' direction (third direction). The X-X' direction is substantially orthogonal to the Z-Z' and Y-Y' directions and includes an X direction (one side in the third direction) and an X' direction (the other side in the third direction).

The detection sensor S1 includes a sensor unit U (hereinafter also referred to simply as the "unit U"). The unit U includes a vibratable film 100. The vibratable film 100 is constituted by a piezoelectric film exhibiting pyroelectricity. The vibratable film 100 includes a film body 110, a first electrode 120, and a second electrode 130. The film body 110 is, for example, a resin film, such as a piezoelectric film, having a dimension in the Z-Z' direction (i.e., thickness dimension) of about 40 μm or about 80 μm. The film body 110 includes a first face on a Z-direction side and a second face on a Z'-direction side. The first electrode 120 is provided on the first face of the film body 110. The second electrode 130 is provided on the second face of the film body 110. Note that the Z-Z' direction is a thickness direction of the vibratable film 100.

The vibratable film 100 is configured to be irradiated with infrared rays and thereby generate first electric signals through a pyroelectric effect. Specifically, the vibratable film 100 is spontaneously polarized when not irradiated with infrared rays. When the vibratable film 100 is irradiated with infrared rays resulting in a change in temperature of the vibratable film 100, the spontaneous polarization of the vibratable film 100 accordingly changes to cause a change in voltage of the vibratable film 100, i.e., to generate the first electric signals.

The vibratable film 100 is further configured to be vibrated by sound waves and thereby generate second electric signals through a piezoelectric effect. Specifically, the vibratable film 100 is configured to vibrate and thereby undergo distortion to accordingly cause a change in voltage, i.e., to generate the second electric signals.

The unit U further includes a case 200. The case 200 accommodates the vibratable film 100. The case 200 is constituted by an electrically conductive material (e.g., a metal or the like material). The case 200 includes a top plate 210 and a tubular portion 220. The top plate 210 is disposed on the Z-direction side relative to the vibratable film 100. The top plate 210 includes an opening 211 extending through the top plate 210 in the Z-Z' direction. The opening 211 is also disposed on the Z-direction side relative to the vibratable film 100. The tubular portion 220 extends in the Z' direction from a perimeter portion of the top plate 210. The tubular portion 220 may include a locking portion 221. The locking portion 221 is an end portion on the Z'-direction side of the tubular portion 220, and may be bent in a generally L shape or extend in the Z-Z' direction. The locking portion 221 can be omitted. In this case, the tubular portion 220 may be a close-bottomed tube.

The unit U may further include a circuit board 300. The circuit board 300 is fixed to the case 200. For example, where the locking portion 221 is provided, the circuit board 300 may be fixed to the locking portion 221, which is bent in a generally L shape, of the tubular portion 220 of the case 200 (see FIGS. 2A to 2C), may be fixed by securely inserting the locking portion 221, which extends in the Z-Z' direction, of the tubular portion 220 of the case 200 into an engagement hole of the circuit board 300 (not shown), may be fixed by bonding the locking portion 221 of the tubular portion 220 of the case 200 onto the circuit board 300 with a conductive adhesive or the like (not shown). Where the locking portion 221 is not provided, the circuit board 300 may be placed on a bottom of the tubular portion 220 of the case 200. The circuit board 300 is disposed on the Z'-direction side relative to, and in spaced relation to, the vibratable film 100. The circuit board 300 includes a first face on the Z-direction side and a second face on the Z'-direction side. On the second face of the circuit board 300 provided is an electrode 310 for external connection. The circuit board 300 can be omitted.

The unit U may further include a field effect transistor 400 (hereinafter also referred to as the FET 400). The FET 400 is electrically connected to the vibratable film 100. The FET 400 is mounted on the circuit board 300 (see FIGS. 2A to 2C). The FET 400 is not shown in FIGS. 3A and 3B for convenience of illustration. The FET 400 is configured to receive the first electric signals and/or the second electric signals from the vibratable film 100, perform impedance conversion on the first electric signals and/or the second electric signals, and output the converted first electric signals and/or the converted second electric signals as output signals. Where the output signals from the FET 400 are outputted to outside of the detection sensor S1, the output signals from the FET 400 are may be outputted from the electrode 310 of the circuit board 300 to the outside of the detection sensor S1. The FET 400 can also be omitted. In this case, the FET 400 may be mounted on another circuit board (not shown) outside the detection sensor S1 and electrically connected to the vibratable film 100.

The unit U may further include a conductive ring 500 and a gate ring 600 of a tubular shape. The conductive ring 500 is interposed between a perimeter portion of the vibratable film 100 and the top plate 210 of the case 200, and is in contact with the first electrode 120 of the vibratable film 100. In this case, the case 200 is constituted by an electrically conductive material. The gate ring 600 is electrically conductive, interposed between the perimeter portion of the vibratable film 100 and the circuit board 300, and in contact with the second electrode 130 of the vibratable film 100. The first electrode 120 of the vibratable film 100 is electrically connected to the FET 400 via the conductive ring 500, the case 200, and the circuit board 300, and the second electrode 130 of the vibratable film 100 is electrically connected to the FET 400 via the gate ring 600 and the circuit board 300. The FET 400 is thus electrically connected to the vibratable film 100.

The unit U may further include a holder 700 of a tubular shape. The holder 700 is constituted by an electrically insulating material. The holder 700 is disposed between the gate ring 600 and the tubular portion 220 of the case 200. Accordingly, the holder 700 has an inner shape in a cross section along the X-X' direction that is the same as an outer shape in the cross section along the X-X' direction of the gate ring 600, and the holder 700 has inner dimensions in a cross section along the Y-Y' and X-X' directions that are substantially equal to, or slightly larger than, outer dimensions in the cross section along the Y-Y' and X-X' directions of the gate ring 600. Also, the holder 700 has an outer shape in a cross section along the Y-Y' and X-X' directions that is the same as an inner shape in the cross section along the Y-Y' and X-X' directions of the tubular portion 220 of the case 200, and has outer dimensions in a cross section along the Y-Y' and X-X' directions that are substantially equal to, or slightly smaller than, inner dimensions in the cross section along the Y-Y' and X-X' directions of the tubular portion 220 of the case 200. The holder 700 may or may not be in contact with a portion of the vibratable film 100 that is located outside a portion of the vibratable film 100 that is contacted by the gate ring 600. Also, the holder 700 may or may not be in contact with the circuit board 300. The holder 700 can be omitted.

The detection sensor S1 further includes a holder H. The holder H includes a holding portion 10 and a front portion 20.

The holding portion 10 holds the unit U. For example, the holding portion 10 is constituted by an insulating material, such as an insulating resin or the like material, and has one of the following configurations (1) to (3).

(1) The holding portion 10 includes a tubular portion 11 (see FIGS. 1A to 3B). The tubular portion 11 includes a thin portion 11*a* of a tubular shape and a thick portion 11*b* of a tubular shape. The thin portion 11*a* extends from the front portion 20 in the Z' direction. The thick portion 11*b* extends from the thin portion 11*a* in the Z' direction. The thick portion 11*b* has a thickness dimension T1 that is larger than a thickness dimension T2 of the thin portion 11*a*. The thick portion 11*b* of the tubular portion 11 fits over the case 200 of the unit U and holds the unit U. In other words, the case 200 of the unit U fits in the thick portion 11*b* and is held by the tubular portion 11. As such, the thick portion 11*b* has an inner shape in a cross section along the Y-Y' and X-X' directions that is the same as an outer shape in the cross section along the Y-Y' and X-X' directions of the tubular portion 220 of the case 200, and the thick portion 11*b* has inner dimensions in a cross section along the Y-Y' and X-X' directions that are substantially equal to, or slightly smaller than, outer dimensions in the cross section along the Y-Y' and X-X' directions of the tubular portion 220 of the case 200. A circumferential direction about a central axis of the tubular portion 11 of the holding portion 10 will be hereinafter referred to simply as the "circumferential direction".

(2) The holding portion 10 includes a tubular portion 11, but the tubular portion 11 does not include the thin portion 11*a* nor the thick portion 11*b* (not shown). The tubular portion 11 has a substantially uniform thickness dimension from an end on the Z-direction side to an end on the Z'-direction side. The tubular portion 11 extends from the front portion 20 in the Z' direction. The tubular portion 11 fits over the case 200 of the unit U and holds the unit U. In other words, the case 200 of the unit U fits in the tubular portion 11 and is held by the tubular portion 11. As such, the tubular portion 11 has an inner shape in a cross section along the Y-Y' and X-X' directions that is the same as an outer shape in the cross section along the Y-Y' and X-X' directions of the tubular portion 220 of the case 200, and the tubular portion 11 has inner dimensions in a cross section along the Y-Y' and X-X' directions that are substantially equal to, or slightly smaller than, outer dimensions in the cross section along the Y-Y' and X-X' directions of the tubular portion 220 of the case 200.

(3) The holding portion 10 includes a tubular portion 11 and a plurality of holding arms (not shown). The tubular portion 11 extends from the front portion 20 in the Z' direction. The holding arms extend from the tubular portion 11 in the Z' direction and are arranged in spaced relation along the circumferential direction. The holding arms elastically hold the case 200 of the unit U, and the top plate 210 of the case 200 of the unit U fits in, and is held by, the tubular portion 11.

The front portion 20 may be, but is not required to be, constituted by an insulating material, such as an insulating resin or the like material, and integrated with the holding portion 10. The front portion 20 is disposed on the Z-direction side relative to the case 200 of the unit U. For example, the front portion 20 may be disposed on the Z-direction side relative to the case 200 of the unit U with a gap G therebetween and opposed to the case 200. Where the holding portion 10 has the above configuration (1), the gap G is defined by the front portion 20, the top plate 210 of the case 200, and the thin portion 11*a* of the holding portion 10. Where the holding portion 10 has the above configuration (2) or (3), the gap G is defined by the front portion 20, the top plate 210 of the case 200, and the tubular portion 11 of the holding portion 10. In any of these cases, the gap G exists between the front portion 20 and the case 200 of the unit U and communicates with the opening 211 of the case 200.

The front portion 20 may or may not include a holding hole 21. The holding hole 21 has the following configuration (4) or (5).

(4) The holding hole 21 includes a first hole 21*a* and a second hole 21*b*. The first hole 21*a* is open in the Z direction. The second hole 21*b* is located on the Z'-direction side relative to, communicates with, the first hole 21*a*, and is open in the Z' direction. The second hole 21*b* has a shape in a cross section along the Y-Y' and X-X' directions that is the same as, or different from, an inner shape in the cross section along the Y-Y' and X-X' directions of the first hole 21*a*. The second hole 21*b* has dimensions in a cross section along the Y-Y' and X-X' directions that are smaller than dimensions in the cross section along the Y-Y' and X-X' directions of the first hole 21*a*.

(5) The holding hole 21 is a through-hole extending in the Z-Z' direction through the front portion 20. The holding hole 21 has dimensions that are substantially the same in any cross section along the Y-Y' and X-X' directions from an end on the Z-direction side to an end on the Z'-direction side of the holding hole 21.

The holder H or the case 200 may further include at least one stop 60. The at least one stop 60 may be a single stop 60 or a plurality of stops 60.

Where the single stop or plurality of stops 60 are provided at the holder H, the single stop or plurality of stops 60 are constituted by an insulating material, such as an insulating resin or the like material, and provided at the front portion 20 or the holding portion 10. Where the single stop or plurality of stops 60 are provided at the front portion 20, the single stop or plurality of stops 60 are a protrusion or protrusions extending from the front portion 20 in the Z' direction (see FIGS. 2A to 2D). Where the single stop or plurality of stops 60 are provided at the holding portion 10 (not shown), the single stop or plurality of stops 60 are a protrusion or protrusions extending from the tubular portion 11 of one of the above-described configurations (1) to (3) of the holding portion 10 toward the central axis of the tubular portion 11. In any of these cases, the single stop or plurality of stops 60 are disposed on the Z'-direction side relative to the front portion 20. The single stop or plurality of stops 60 abut the top plate 210 of the case 200 of the unit U from the Z-direction side. This arrangement allows reserving the gap G between the front portion 20 and the case 200 of the unit U.

Where the single stop or plurality of stops 60 are provided at the case 200, the single stop or plurality of stops 60 are a protrusion or protrusions extending from the top plate 210 of the case 200 in the Z direction. The single stop or plurality of stops 60 abut the front portion 20 from the Z'-direction side. This arrangement allows reserving the gap G between the front portion 20 and the case 200 of the unit U.

The at least one stop 60 can be omitted. In this case, the unit U is held by the holding portion 10 in a manner described above and thereby placed in position, which allows reserving the gap G between the front portion 20 and the case 200 of the unit U.

The holder H further includes a transmissive part 30. The transmissive part 30 is configured to transmit at least infrared rays. The transmissive part 30 may include an optical filter configured to transmit infrared rays. The optical filter may be configured to transmit infrared rays in a predetermined wavelength band. For example, the optical filter may be configured to transmit infrared rays in a wavelength band from about 0.7 μm to about 14 μm, may be configured to transmit infrared rays and light in a wavelength band or bands near the infrared band (e.g., visible light rays in a wavelength band from about 0.4 μm to about 0.78 μm and/or microwaves in a wavelength band from 1 mm to 1 m). The optical filter may be constituted by an optical lens made of silicone resin or the like material. The optical filter may, but is not limited to, have a thickness dimension (i.e., dimension in the Z-Z' direction) of 0.55 mm±0.05 mm and exhibit an average transmittance of 70% or over for light in a wavelength region from 7 μm to 14 μm incident at an angle (incident angle) from about 10 degrees to about 20 degrees onto the optical filter.

The transmissive part 30 may include a transmissive part body 31 and a peripheral portion 32 around the transmissive part body 31. The transmissive part body 31 may be constituted by the above-described optical filter, and the peripheral portion 32 may be constituted by a resin molded around the transmissive part body 31. Alternatively, the transmissive part body 31 may be constituted by a central portion of the above-described optical filter, and the peripheral portion 32 may be constituted by a peripheral portion of the optical filter. The peripheral portion 32 of the latter may or may not be subjected to printing, masking, or the like.

The transmissive part body 31 of the transmissive part 30 may be constituted not by the above-described optical filter, but by a resin, glass, or the like material being transparent or translucent and configured to transmit at least infrared rays. The transmissive part 30 in its entirety may be constituted by such resin, glass, or the like material.

The transmissive part 30 is provided at the front portion 20 of the holder H. For example, the transmissive part 30 is provided at the front portion 20 of the holder H in one of the following manners (6) to (8).

Where the front portion 20 is provided with the holding hole 21 and the holding hole 21 has the above configuration (4), (6) the transmissive part 30 is securely accommodated in the first hole 21*a* of the holding hole 21 of the front portion 20. The transmissive part 30 has an outer shape in a cross section along the Y-Y' and X-X' directions that is substantially the same as the shape in the cross section along the Y-Y' and X-X' directions of the first hole 21*a*, and the transmissive part 30 has outer dimensions in a cross section along the Y-Y' and X-X' directions that are substantially equal to, or slightly smaller than, the dimensions in the cross section along the Y-Y' and X-X' directions of the first hole 21*a*. In this case, the transmissive part 30 is exposed in the Z direction from the first hole 21*a* of the front portion 20. The transmissive part 30 is exposed in the Z' direction from the second hole 21*b* of the holding hole 21 of the front portion 20, disposed on the Z-direction side relative to the second hole 21*b*, the gap G, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

Where the front portion 20 is provided with the holding hole 21 and the holding hole 21 has the above configuration (5), (7) the transmissive part 30 is securely accommodated in the holding hole 21 of the front portion 20. The transmissive part 30 has an outer shape in a cross section along the Y-Y' and X-X' directions that is substantially the same as a shape in the cross section along the Y-Y' and X-X' directions of the holding hole 21, and the transmissive part 30 has outer dimensions in a cross section along the Y-Y' and X-X' directions that are substantially equal to, or slightly smaller than, the dimensions in the cross section along the Y-Y' and X-X' directions of the holding hole 21. In this case, the transmissive part 30 is exposed in the Z and Z' directions from the holding hole 21 of the front portion 20, disposed on the Z-direction side relative to the gap G, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

Where the front portion 20 is not provided with the holding hole 21, (8) the transmissive part 30 is embedded in the front portion 20 of the holder H by insert molding or the like means. In this case, the transmissive part 30 is exposed in the Z and Z' directions from the front portion 20, disposed on the Z-direction side relative to the gap G, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

The holder H further includes at least one sound hole 40 to input therethrough sound waves. Where the at least one sound hole 40 is a single sound hole, the single sound hole 40 is provided in a portion around the transmissive part 30 of the front portion 20. Where the at least one sound hole 40 is a plurality of sound holes, the plurality of sound holes 40 are provided in the portion around the transmissive part 30 of the front portion 20 and are arranged in spaced relation along the circumferential direction. The single sound hole or plurality of sound holes 40 extend in the Z-Z' direction through the portion around the transmissive part 30 of the front portion 20, are open in both the Z and Z' directions, and communicate with the gap G. As such, the single sound hole or plurality of sound holes 40 can receive input of sound waves from the Z-direction side.

Where the holding portion 10 has the above configuration (1), the single sound hole or plurality of sound holes 40 are opposed to the tubular portion 11 of the holding portion 10 and/or the top plate 210 (a peripheral edge of the opening 211) of the case 200 of the unit U with the gap G existing therebetween, but opposed to neither the opening 211 of the case 200 nor the vibratable film 100 of the unit U. Where the holding portion 10 has the above configuration (2) or (3), the single sound hole or plurality of sound holes 40 are opposed to the top plate 210 (the peripheral edge of the opening 211) of the case 200 of the unit U with the gap G existing therebetween, but opposed to neither the opening 211 of the case 200 nor the vibratable film 100 of the unit U. In either case, the vibratable film 100 is not exposed to outside of the holder H through the opening 211, the gap G, or the single sound hole or plurality of sound holes 40 of the case 200.

The holder H further includes a sound path 50. The sound path 50 includes the gap G. The gap G exists between the front portion 20 of the holder H and the case 200 of the unit U and forms the sound path, which extends from the single sound hole or plurality of sound holes 40 to the opening 211 of the case 200. Sound waves inputted from the single sound hole or plurality of sound holes 40 pass through the gap G (sound path) and the opening 211 of the case 200 of the unit U and vibrate the vibratable film 100.

The detection sensor S1 may further include a cover C configured to pass therethrough sound waves. The cover C may be constituted by a cloth, or by a waterproof and/or dustproof sheet (not shown). Where the at least one sound hole 40 is the single sound hole, the cover C is provided on the portion around the transmissive part 30 of the front portion 20 of the holder H, and covers the sound hole 40 from the Z-direction side. Where the at least one sound hole 40 is the plurality of sound holes, the cover C has a ring shape, is provided on the portion around the transmissive part 30 of the front portion 20 of the holder H, and covers the plurality of sound holes 40 from the Z-direction side. The cover C can be omitted. Even in this case, as described above, the vibratable film 100 is not exposed to outside of the holder H through the gap G or the single sound hole or plurality of sound holes 40.

A method of assembling the unit U into the holder H will now be described in detail. First, the unit U and the holder H are prepared. In the prepared holder H, the front portion 20 is provided with the transmissive part 30 in a manner described above.

Where the holding portion 10 of the holder H has the above configuration (1), the unit U is fitted into the thick portion 11b of the holding portion 10 of the holder H from the Z'-direction side. Where the holder H is provided with the single stop or plurality of stops 60, the single stop or plurality of stops 60 is brought into abutment with the top plate 210 of the case 200 of the unit U. At this time, the gap G is defined by the front portion 20 and the tubular portion 11 of the holder H and the top plate 210 of the case 200, the transmissive part 30 of the holder H is opposed to the vibratable film 100 of the unit U with the gap G and the opening 211 of the top plate 210 of the case 200 existing therebetween, and the single sound hole or plurality of sound holes 40 of the holder His opposed to the thick portion 11b of the holding portion 10 and/or the top plate 210 (the peripheral edge of the opening 211) of the case 200 with the gap G existing therebetween. Where the holder H is not provided with the single stop or plurality of stops 60, the unit U is fitted into the thick portion 11b of the holding portion 10 of the holder H from the Z' direction, whereby as described above, the gap G is defined, the transmissive part 30 of the holder H is opposed to the vibratable film 100 of the unit U, and the single sound hole or plurality of sound holes 40 of the holder H is opposed to the thick portion 11b of the holding portion 10 and/or the top plate 210 of the case 200. The unit U is thus held in the holding portion 10 of the holder H.

Where the holding portion 10 of the holder H has the above configuration (2), the unit U is fitted into the tubular portion 11 of the holding portion 10 of the holder H from the Z'-direction side. Thus the unit U is held in the holding portion 10 of the holder H, as in the case where the holding portion 10 of the holder H has the above configuration (1) and the single stop or plurality of stops 60 is provided, or alternatively, the case where the holding portion 10 of the holder H has the above configuration (1) and the single stop or plurality of stops 60 is not provided.

Where the holding portion 10 of the holder H has the above configuration (3), the unit U is made to be held by the plurality of holding arms of the holding portion 10 of the holder H. Thus the unit U is held in the holding portion 10 of the holder H, as in the case where the holding portion 10 of the holder H has the above configuration (1) and the single stop or plurality of stops 60 is provided, or alternatively, the case where the holding portion 10 of the holder H has the above configuration (1) and the single stop or plurality of stops 60 is not provided.

Figure 4:
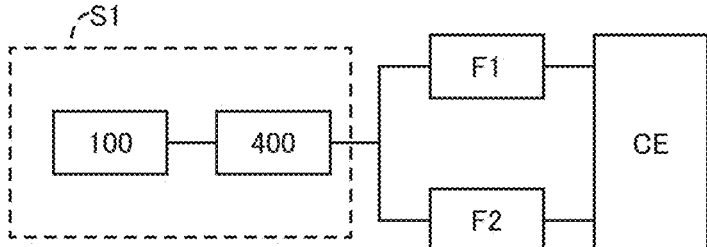
FIG. 4 is a block diagram of a detection device according to the first embodiment of the invention.

A detection device D according to a plurality of embodiments including the first embodiment of the invention will now be described with reference to FIG. 4. FIG. 4 shows the detection device D according to the first embodiment.

The detection device D may include the detection sensor S1 according to one of the above aspects, a low-pass filter F1, and a high-pass filter F2.

The low-pass filter F1 is electrically connected to the FET 400 to receive output signals from the FET 400. The low-pass filter F1 may be provided on a circuit board (not shown), which is electrically connected to the circuit board 300, or on the circuit board 300. The low-pass filter F1 is configured to pass signals in a frequency band (first frequency band) out of the received output signals, where the signals in the first frequency band are obtained by impedance converting the first electric signals. The low-pass filter F1 is also configured to attenuate signals in a frequency band higher than the frequency band of the signals capable of passing through the low-pass filter (attenuate signals in a frequency band higher than the first frequency band). Specifically, signals obtained by impedance converting the first electric signals fall within a frequency band of 0.35 Hz to 5.0 Hz, and accordingly the low-pass filter F1 is configured to pass, out of the received output signal, signals in a frequency band of 10 Hz and lower and to attenuate signals in a frequency band of higher than 10 Hz (not including 10 Hz).

The high-pass filter F2 is electrically connected to the FET 400 to receive output signals from the FET 400. The high-pass filter F2 may be provided on the circuit board (not shown), which is electrically connected to the circuit board 300, or on the circuit board 300. The high-pass filter F2 is configured to pass, out of the received output signals, signals in a frequency band (second frequency band) higher than the frequency band of the signals capable of passing through the low-pass filter F1 (higher than the first frequency band). The high-pass filter F2 is also configured to attenuate signals in a frequency band lower than the frequency band of the signals capable of passing through the high-pass filter F2 (attenuate signals in a frequency band higher than the second frequency band). For example, the high-pass filter F2 is configured to pass signals in a frequency band of 200 Hz to 300 Hz and to attenuate signals in a frequency band of 200 Hz and lower.

The detection device D may further include a controller CE. The controller CE may be provided on the circuit board (not shown) electrically connected to the circuit board 300, or on the circuit board 300. The controller CE is electrically connected to the low-pass filter F1 and to the high-pass filter F2 individually. The controller CE is configured to receive signals that have passed through the low-pass filter F1 and configured to receive signals that have passed through the high-pass filter F2. The controller CE may be, but is not required to be, electrically connected to the FET 400 to receive output signals from the FET 400.

The controller CE may be configured to determine whether or not the controller CE has received signals only from the low-pass filter F1. Hereinafter described is a non-limiting example configuration of the controller CE. The controller CE determines whether or not it has received signals from the low-pass filter F1 (first determination). If the controller CE determines that it has received signals from the low-pass filter F1, then the controller CE counts for a predetermined period, using a timer circuit or a software timer on an internal memory in the controller CE, and determines whether or not it has received signals from the high-pass filter F2 within the predetermined period (second determination). If the controller CE determines that it has received signals from the high-pass filter F2 within the predetermined period (that is, if the controller CE determines that it has received signals not only from the low-pass filter F1), then the controller CE returns to the processing of the first determination. On the other hand, if the controller CE determines that it has not received any signals from the high-pass filter F2 within the predetermined period, the controller CE determines that it has received signals only from the low-pass filter F1. In this example configuration, the controller CE is configured to perform the second determination within the predetermined period after performing the first determination. Instead, the controller CE may be configured to perform the first determination within the predetermined period after performing the second determination.

If the controller CE determines that it has received signals only from the low-pass filter F1, since this determination means that the controller CE has only received signals obtained by impedance converting the first electric signals from the vibratable film 100 that have been generated by irradiating the vibratable film 100 with infrared rays, the controller CE determines that the infrared rays have been applied to the vibratable film 100. This is how the controller CE is able to detect infrared rays. If the controller CE determines that it has received signals not only from the low-pass filter F1, since this determination means that the controller CE has received signals obtained by impedance converting the second electric signals from the vibratable film 100 that have been generated by vibration of the vibratable film 100 due to sound waves, the controller CE determines that the vibratable film 100 has been vibrated by sound waves. This is how the controller CE is able to detect sound waves.

The controller CE may be further configured such that if the controller CE determines that it has received signals only from the low-pass filter F1, the controller CE performs signal processing, such as voice recognition processing, on signals received from the FET 400, or alternatively on signals received from the low-pass filter F1 and on signals received from the high-pass filter F2. The controller CE may also be configured to amplify signals received from the FET 400, or alternatively signals received from the low-pass filter F1 and signals received from the high-pass filter F2, and perform the above-described signal processing on the amplified signals.

The controller CE may be configured to return to the first determination on the basis of externally provided instruction information. Alternatively, the controller CE may be configured such that if it determines that it has received signals only from the low-pass filter F1, the controller CE counts for a predetermined period, using the timer circuit or the software timer on the internal memory in the controller CE, and perform signal processing within the predetermined period in one of the above manners. The controller CE may be configured to return to the processing of the first determination after the predetermined period has elapsed. The controller CE may not include the configuration for performing the above signal processing and may be configured to repeat the processing of the first determination and the processing of the second determination in this order or in the reverse order.

In general, since a human body emits infrared rays having a peak wavelength of about 10 μm (1000 nm), the emitted infrared rays transmit through the transmissive part 30 of the detection sensor S1 and are projected onto the vibratable film 100, so that the detection device D can detect an approach of the human body (including placing a hand over the detection sensor S1) in a manner described above. Where the detection device D is incorporated in a waste container, for example, the detection device D can detect the approach of the human body on the basis of infrared irradiation onto the vibratable film 100 as described above and may be configured to perform voice recognition processing on a voice inputted to the detection sensor S1. In this case, the waste container may be configured to open and close a lid thereof in response to either detection of an approach of a human or detection of a voice. Also where the detection device D is incorporated in furniture, an electrical appliance, or the like, as in a waste container, the furniture, the electrical appliance, or the like can be operated by either detecting an approach of a human or detecting a sound. Where the detection device D is incorporated in a vending machine or a ticket machine, for example, the detection device D may be configured to detect an approach of a human body on the basis of infrared irradiation onto the vibratable film 100 and then perform voice recognition processing on a voice inputted to the detection sensor S1 as described above. In this case, after detecting the approach of the human, the vending machine or the ticket machine may allow the human to purchase a product by his or her voice without touching the vending machine or the ticket machine with the human body. Where the detection device D is incorporated in a fire detector, for example, the detection device D may be configured to detect a temperature change caused by a fire or other event on the basis of infrared irradiation onto the vibratable film 100 and then perform voice recognition processing on a voice inputted to the detection sensor S1 as described above. In this case, after detecting the temperature change caused by the fire or other event, the fire detector can transmit processed voice data through the Internet or other lines. In addition, the fire detector may be configured to turn on an alarm buzzer or the like in response to the detection of the temperature change caused by the fire or other event. Where the detection device D is incorporated in an alarm device, such as a security camera, the detection device D may be configured to detect an approach of a human body on the basis of infrared irradiation onto the vibratable film 100 and then perform voice recognition processing as described above. In this case, after detecting the approach of the human, the alarm device may record processed voice data (voices, sounds, or the like) and/or transmit the processed voice data through the Internet or other lines.

The detection sensor S1 described above provides at least the following technical features and effects (1) to (5).

Technical Feature and Effect (1): The detection sensor S1 can receive input of infrared rays and input of sound waves from the same direction (Z direction) for the following reasons. The front portion 20 of the holder H is disposed on the Z-direction side relative to the case 200 of the unit U. The transmissive part 30 of the holder H is provided at the front portion 20, exposed from the front portion 20 in the Z and Z' directions, and opposed to the vibratable film 100 with the opening 211 of the case 200 interposed therebetween. As such, the detection sensor S1 allows at least infrared rays to transmit from the Z-direction side through the transmissive part 30 of the holder H and be projected onto the vibratable film 100. Also, the at least one sound hole 40 is provided in the portion around the transmissive part 30 of the front portion 20 of the holder H, is open in the Z direction, and communicates with the gap G. The gap G communicates with the opening 211 of the case 200. As such, the detection sensor S1 also allows sound waves to enter into the at least one sound hole 40 from the Z-direction side, to pass through the at least one sound hole 40, the gap G, and the opening 211, and to vibrate the vibratable film 100.

Technical Feature and Effect (2): The vibratable film 100 is not exposed to outside of the detection sensor S1 for the following reasons. The transmissive part 30 of the holder H is provided at the front portion 20 and opposed to the vibratable film 100 with the opening 211 of the case 200 interposed therebetween. The at least one sound hole 40 is provided in the portion around the transmissive part 30 of the front portion 20 of the holder H. Accordingly, the vibratable film 100 is not exposed to outside of the detection sensor S1 through the at least one sound hole 40, the sound path 50 (gap G), or the opening 211. These arrangements reduce the possibility that dirt, dust, water, or the like (these will be hereinafter referred to collectively as "dirt, etc.") enters the detection sensor S1 through the at least one sound hole 40 and the gap G and adheres to the vibratable film 100. In addition, where the cover C is provided, the cover C blocks the at least one sound hole 40, further reducing the possibility that the dirt, etc. enters the detection sensor S1 through the at least one sound hole 40 and the gap G and adheres to the vibratable film 100.

Technical Feature and Effect (3): By changing the number and/or dimensions of the at least one sound hole 40 of the detection sensor S1, it is possible to adjust frequency characteristics of sound waves in a high frequency band (e.g., 3 kHz to 20 kHz) to be received into the detection sensor S1 from the at least one sound hole 40.

Technical Feature and Effect (4): The unit U is configured to be held by the holding portion 10 of the holder H, making it possible to set a desired holding position of the holding portion 10 relative to the unit U. Changing the holding position of the holding portion 10 relative to the unit U changes a linear distance in the Z-Z' direction between the transmissive part 30 of the holder H and the vibratable film 100 of the unit U held by the holding portion 10 of the holder H, making it possible to change the sensitivity of the detection sensor S1 to infrared rays. Moreover, by increasing the linear distance increases in accordance with the change of the holding position of the holding portion 10 relative to the unit U, it is also possible to increase an incident angle of infrared rays relative to the vibratable film 100 of the detection sensor S1. The incident angle herein means an angle which a line perpendicular to the surface of the vibratable film 100 of the detection sensor S1 (i.e., (the normal to this surface) forms with infrared rays incident on the vibratable film 100 of the detection sensor S1.

Technical Feature and Effect (5): The detection sensor S1 has improved versatility for the following reasons. Since the detection sensor S1 is configured such that the vibratable film 100 thereof is not exposed to outside of the detection sensor S1 as described above, the detection sensor S1 can be installed in a place laden with dirt or dust and/or a place where water may adhere to.

Since the detection device D includes the detection sensor S1, the detection device D also provides the above technical features and effects (1) to (5).

Second Embodiment

Figure 5A:
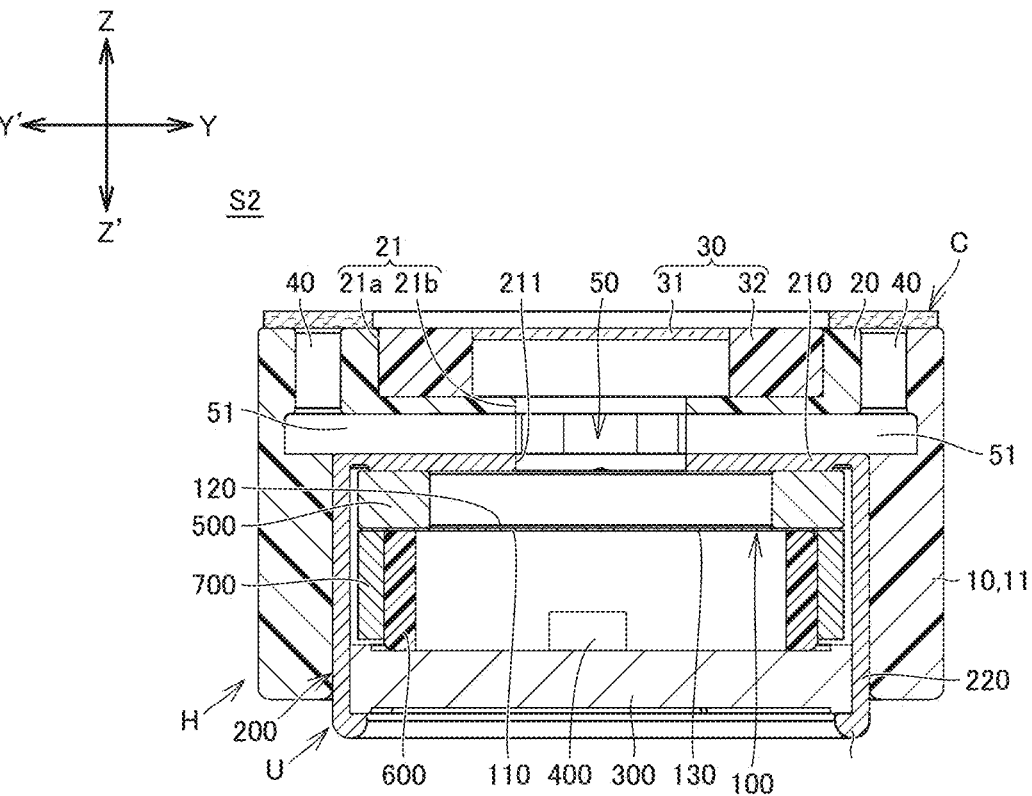
FIG. 5A is a cross-sectional view, which corresponds to FIG. 2A, of a detection sensor according to a second embodiment of the invention.
Figure 5B:
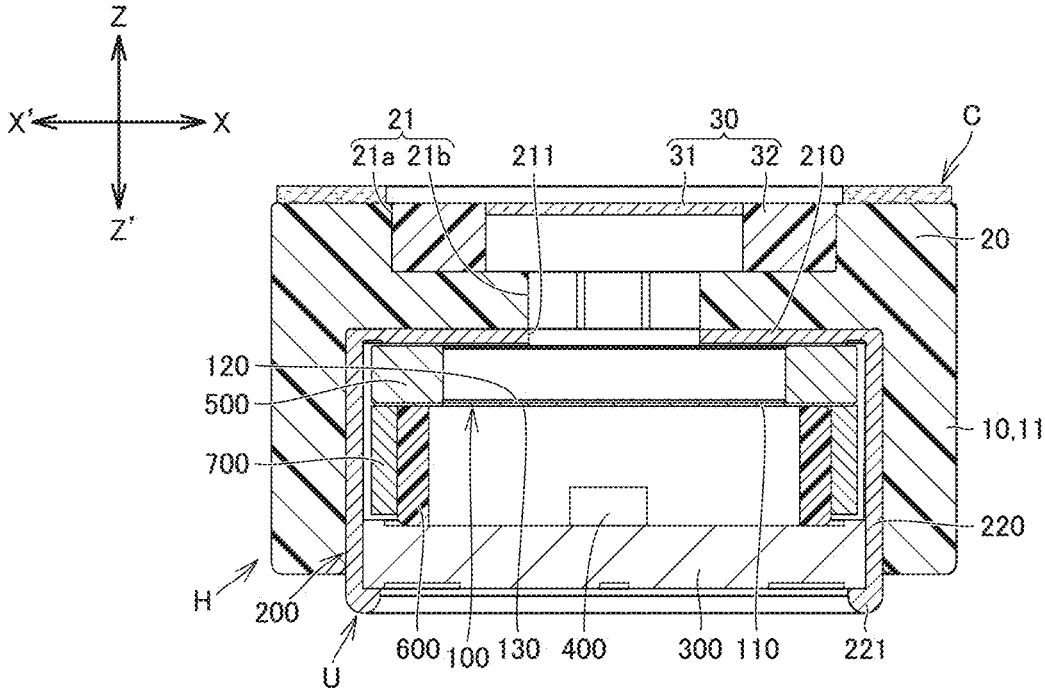
FIG. 5B is a cross-sectional view, which corresponds to FIG. 2B, of the detection sensor of the second embodiment.
Figure 5C:
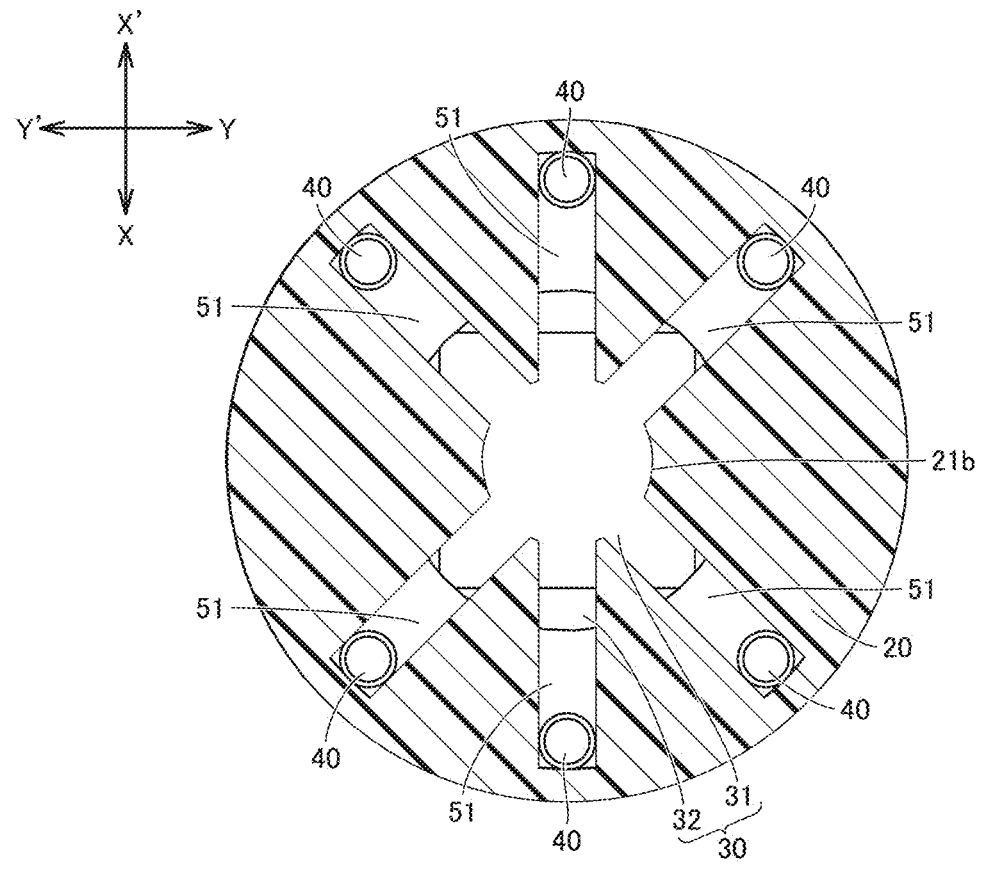
FIG. 5C is a cross-sectional view, which corresponds to FIG. 2D, of the detection sensor of the second embodiment.

A detection sensor S2 according to a plurality of embodiments of the invention, including a second embodiment and variants thereof, will now be described with reference to FIGS. 5A to 5C. FIGS. 5A to 5C illustrate the detection sensor S2 of the second embodiment. The detection sensor S2 is configured similarly to the detection sensor S1 described above except for the following differences: the front portion 20 of the holder H of the detection sensor S2 directly abuts the top plate 210 of the case 200 of the unit U, and the at least one sound hole 40 and the sound path 50 of the holder H are different in configuration from the at least one sound hole 40 and the sound path 50 of the holder H of the detection sensor S1. The detection sensor S2 will be described focusing on these differences and omitting overlapping descriptions. FIG. 5A show the Z-Z' and Y-Y' directions similarly to those in FIG. 2A. FIG. 5B shows the Z-Z' and X-X' directions similarly to those in FIG. 2B. FIG. 5C shows the Y-Y' and X-X' directions similarly to those in FIG. 2D.

The holding portion 10 of the holder H can have any one of the above configurations (1) to (3). In FIGS. 5A to 5C, the holding portion 10 of the holder H has the above configuration (2).

The front portion 20 of the holder H of the detection sensor S2 directly abuts the top plate 210 of the case 200 of the unit U. The gap G is not provided between the front portion 20 of the holder H and the top plate 210 of the case 200, nor the detection sensor S2 is provided with the at least one stop 60.

Where the front portion 20 is provided with the holding hole 21 and the holding hole 21 has the above configuration (4), (9) the second hole 21b of the holding hole 21 of the front portion 20 extends from the first hole 21a to the opening 211 of the case 200 of the unit U (see FIGS. 5A to 5C). In this case, the transmissive part 30 is exposed in the Z direction from the first hole 21a of the holding hole 21 of the front portion 20. Further, the transmissive part 30 is exposed in the Z' direction from the second hole 21b of the holding hole 21 of the front portion 20, disposed on the Z-direction side relative to the second hole 21b, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

Where the front portion 20 is provided with the holding hole 21 and the holding hole 21 has the above configuration (5), (10) the front portion 20 is provided a hole (not shown) in a portion on the Z'-direction side relative to the holding hole 21, and the hole extends from the holding hole 21 to the opening 211 of the case 200 of the unit U. In this case, the transmissive part 30 is exposed in the Z direction from the holding hole 21 of the front portion 20, exposed in the Z' direction from the hole of the front portion 20, and disposed on the Z-direction side relative to the hole, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

Where the front portion 20 is not provided with the holding hole 21, (11) the front portion 20 is provided with a hole (not shown) extending from the transmissive part 30 to the opening 211 of the case 200 of the unit U. In this case, the transmissive part 30 is exposed in the Z direction from the front portion 20, exposed in the Z' direction from the hole of the front portion 20, disposed on the Z-direction side relative to the hole, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

The at least one sound hole 40 and the sound path 50 of the holder H of the detection sensor S2 are provided in a portion around the transmissive part 30 of the front portion 20.

The single sound hole or plurality of sound holes 40 of the holder H of the detection sensor S2 have substantially the same configurations as the single sound hole or plurality of sound holes 40 of the holder H of the detection sensor S1, except that the hole or holes do not extend in the Z-Z' direction through the portion around the transmissive part 30 of the front portion 20. The single sound hole or plurality of sound holes 40 of the holder H of the detection sensor S2 are open to the Z-direction side and can receive input of sound waves from the Z-direction side.

The sound path 50 of the holder H of the detection sensor S2 extends from the single sound hole or plurality of sound holes 40 to the opening 211 of the case 200 and communicates with the single sound hole or plurality of sound holes 40 and the opening 211. For example, the sound path 50 may include a single recess or a plurality of recesses 51 and one of the second hole 21b of the above configuration (9), the hole of the above configuration (10), or the hole of the above configuration (11). Alternatively, the sound path 50 may include a single lateral hole or a plurality of lateral holes (not shown) and one of the second hole 21b of the above configuration (9), the hole of the above configuration (10), or the hole of the above configuration (11). The or each recess 51 extends from the or a corresponding sound hole 40 to one of the second hole 21b of the above configuration (9), the hole of the above configuration (10), or the hole of the above configuration (11), also extends in the Z' direction from the sound hole 40 or the corresponding sound hole 40, and is open in the Z' direction. The or each lateral holes extends from the or a corresponding sound hole 40 to one of the second hole 21b of the above configuration (9), the hole of the above configuration (10), or the hole of the above configuration (11). Sound waves inputted from the single sound hole or plurality of sound holes 40 pass through the sound path 50 of the front portion 20 and the opening 211 of the case 200 of the unit U and vibrate the vibratable film 100.

Where the sound path 50 includes the single recess or plurality of recesses 51 and the holding portion 10 has the above configuration (1), the single sound hole or plurality of sound holes 40 are opposed to the tubular portion 11 of the holding portion 10 and/or the top plate 210 of the case 200 of the unit U with the single recess or plurality of recesses 51 of the sound path 50 existing therebetween, but opposed to neither the opening 211 of the case 200 nor the vibratable film 100 of the unit U with the single recess or plurality of recesses 51 of the sound path 50 existing therebetween. Where the sound path 50 includes the single recess or plurality of recesses 51 and the holding portion 10 has the above configuration (2) or (3), the single sound hole or plurality of sound holes 40 are opposed to the top plate 210 of the case 200 of the unit U with the single recess or plurality of recesses 51 of the sound path 50 existing therebetween, but opposed to neither the opening 211 of the case 200 nor the vibratable film 100 of the unit U with the single recess or plurality of recesses 51 of the sound path 50 existing therebetween. In either case, the vibratable film 100 is not exposed to outside of the holder H through the opening 211 of the case 200, the sound path 50, or the single sound hole or plurality of sound holes 40.

Where the sound path 50 includes the single lateral hole or plurality of lateral holes, the or each sound hole 40 is opposed to a bottom of the or a corresponding lateral hole of the sound path 50, and thus opposed to neither the opening 211 of the case 200 nor the vibratable film 100 of the unit U.

The detection device D of the second embodiment has the same configuration as the detection device D of the first embodiment, except that the detection device D of the second embodiment includes the detection sensor S2 of an aspect described above in place of the detection sensor S1 of an aspect described above.

The detection sensor S2 described above provides at least the following technical features and effects (1) and (2).

Technical Feature and Effect (1): The detection sensor S2 can receive input of infrared rays and input of sound waves from the same direction (Z direction) for the following reasons. The front portion 20 of the holder H is disposed on the Z-direction side relative to the case 200 of the unit U. The transmissive part 30 of the holder H is provided at the front portion 20, exposed from the front portion 20 in the Z and Z' directions, and opposed to the vibratable film 100 with the opening 211 of the case 200 interposed therebetween. As such, the detection sensor S2 allows at least infrared rays to transmit from the Z-direction side through the transmissive part 30 of the holder H and be projected onto the vibratable film 100. Also, the at least one sound hole 40 is provided in the portion around the transmissive part 30 of the front portion 20 of the holder H and is open in the Z direction. The sound path 50 is provided in the front portion 20 and extends from the at least one sound hole 40 to the opening 211 of the case 200. As such, the detection sensor S2 also allows sound waves to enter into the at least one sound hole 40 from the Z-direction side, to pass through the at least one sound hole 40, the sound path 50, and the opening 211, and to vibrate the vibratable film 100.

Technical Feature and Effect (2): The vibratable film 100 is not exposed to outside of the detection sensor S2 for the following reasons. The transmissive part 30 of the holder His provided at the front portion 20 and opposed to the vibratable film 100 with the opening 211 of the case 200 interposed therebetween. The at least one sound hole 40 is provided in the portion around the transmissive part 30 of the front portion 20 of the holder H. Accordingly, the vibratable film 100 is not exposed to outside of the detection sensor S2 through the at least one sound hole 40, the sound path 50, or the opening 211. These arrangements reduce the possibility that dirt, etc. enters the detection sensor S2 through the at least one sound hole 40 and the sound path 50, and adheres to the vibratable film 100. In addition, where the cover C is provided, the cover C blocks the at least one sound hole 40, further reducing the possibility that the dirt, etc. enters the detection sensor S2 through the at least one sound hole 40 and the sound path 50 and adheres to the vibratable film 100.

The detection sensor S2 also provides technical features and effects similar to the technical features and effects (3) to (5) of the detection sensor S1.

The detection device D of the second embodiment, which includes the detection sensor S2, also provides technical features and effects similar to those of the detection sensor S2.

Third Embodiment

Figure 6A:
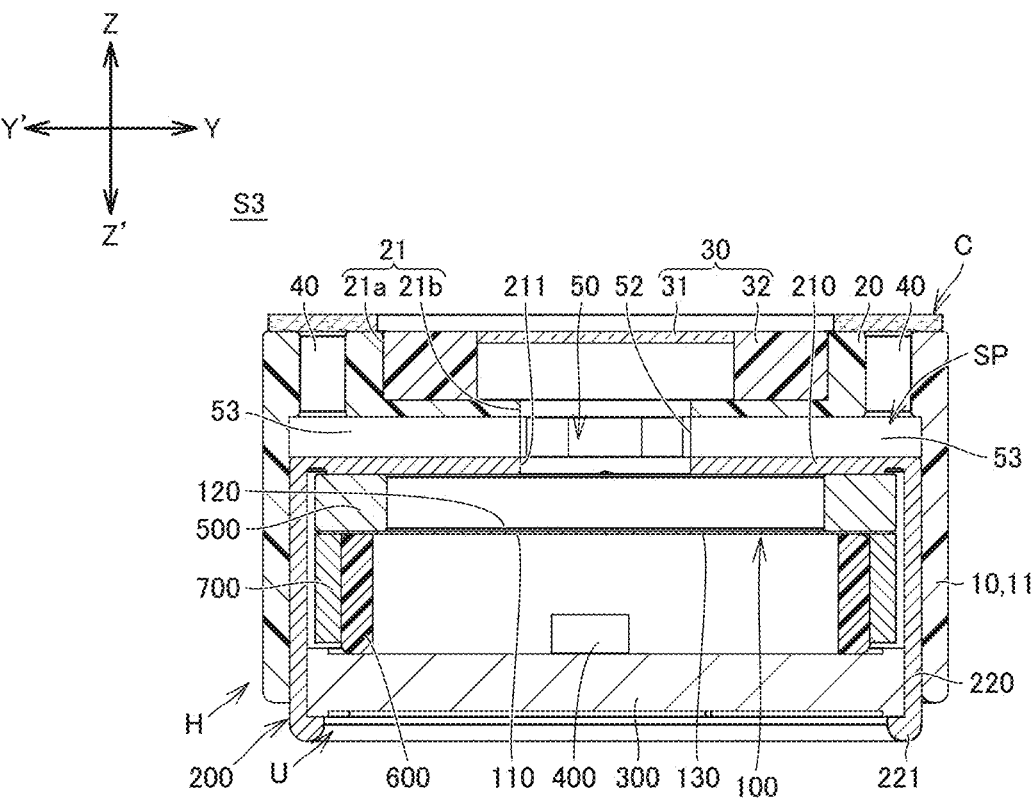
FIG. 6A is a cross-sectional view, which corresponds to FIG. 2A, of a detection sensor according to a third embodiment of the invention.
Figure 6B:
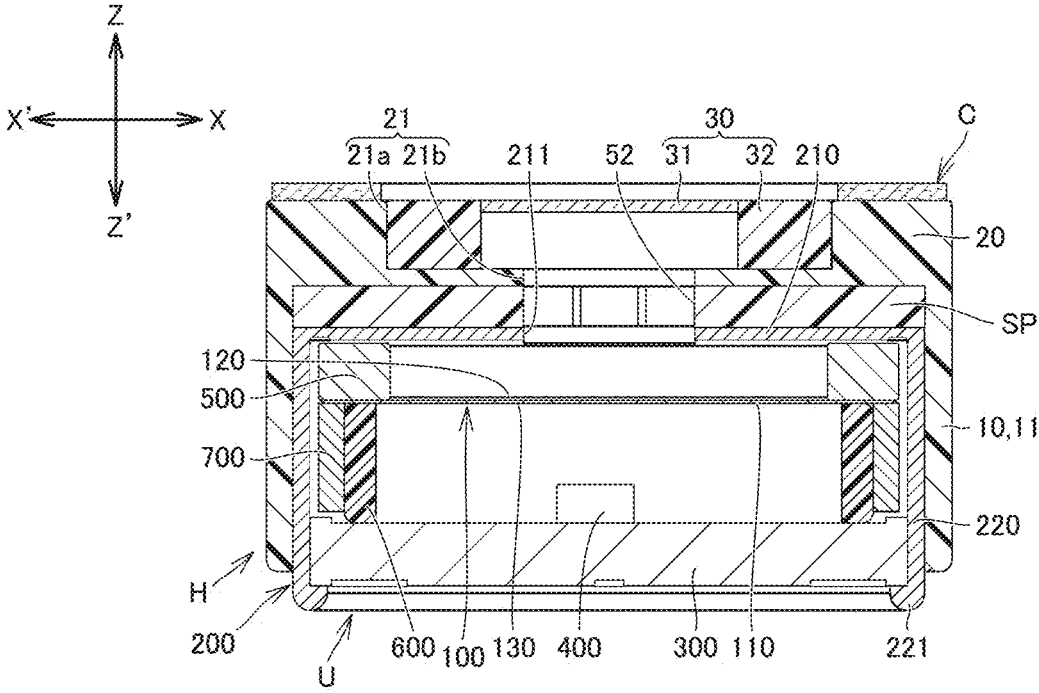
FIG. 6B is a cross-sectional view, which corresponds to FIG. 2B, of the detection sensor of the third embodiment.
Figure 6C:
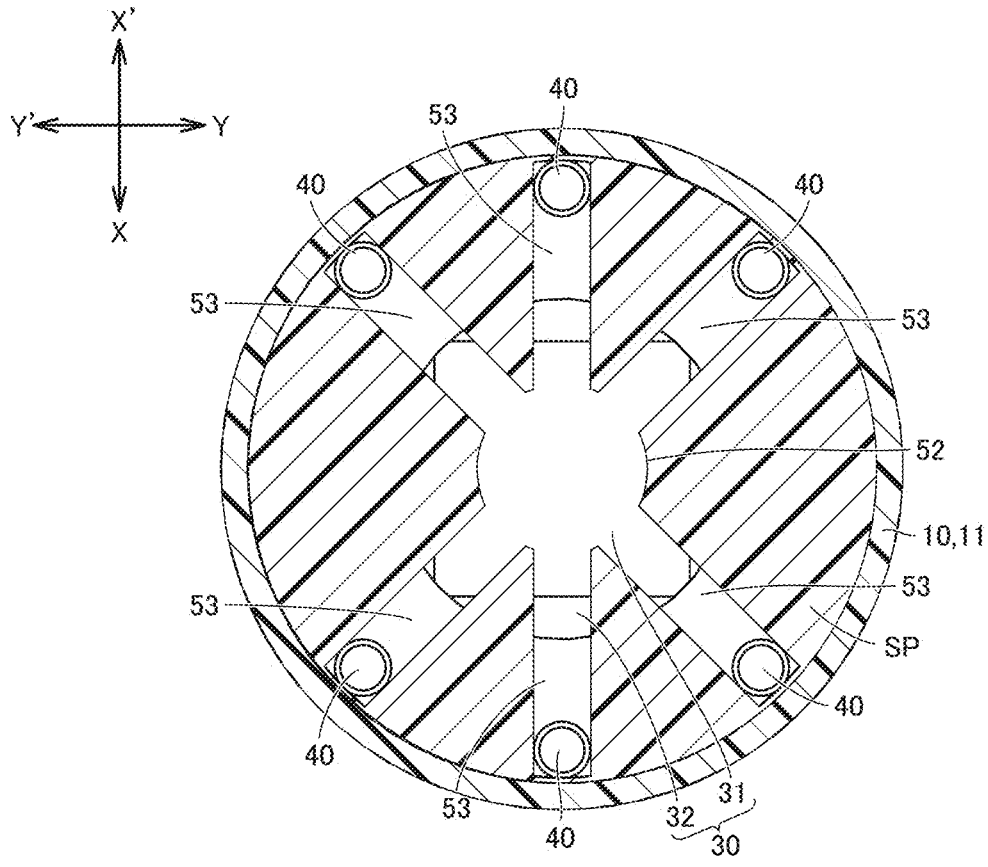
FIG. 6C is a cross-sectional view, which corresponds to FIG. 2D, of the detection sensor of the third embodiment.

A detection sensor S3 according to a plurality of embodiments of the invention, including a third embodiment and variants thereof, will now be described with reference to FIGS. 6A to 6C. FIGS. 6A to 6C illustrate the detection sensor S3 of the third embodiment. The detection sensor S3 is configured similarly to the detection sensor S1 described above except for the following differences: the holder H further includes a spacer SP interposed between the front portion 20 and the top plate 210 of the case 200, and the at least one sound hole 40 and the sound path 50 of the holder H are different in configuration from the at least one sound hole 40 and the sound path 50 of the holder H of the detection sensor S1. The detection sensor S3 will be described focusing on these differences and omitting overlapping descriptions. FIG. 6A show the Z-Z' and Y-Y' directions similarly to those in FIG. 2A. FIG. 6B shows the Z-Z' and X-X' directions similarly to those in FIG. 2B. FIG. 6C shows the Y-Y' and X-X' directions similarly to those in FIG. 2D.

The spacer SP, provided separately from the holding portion 10 and the front portion 20 of the holder H, has a generally ring-shape in a cross section along the Y-Y' and X-X' directions and is constituted by an insulating material, such as an insulating resin or the like material. The spacer SP is provided with a central hole 52 extending in the Z-Z' direction through the spacer SP and being located between the transmissive part 30 and the opening 211 of the case 200 of the unit U. The spacer SP is disposed inside the tubular portion 11 of the holding portion 10 having one of the above configurations (1) to (3), and is interposed between the front portion 20 of the holder H and the top plate 210 of the case 200 of the unit U. The spacer SP abuts the front portion 20 of the holder H from the Z'-direction side and abuts the top plate 210 of the case 200 from the Z direction. In other words, the front portion 20 of the holder H indirectly abuts the top plate 210 of the case 200 via the spacer SP. The gap G is not provided between the front portion 20 of the holder H and the top plate 210 of the case 200, nor the detection sensor S3 is provided with the at least one stop 60. Note that FIGS. 6A to 6C illustrate the holding portion 10 of the holder H of the above configuration (2).

The sound path 50 of the holder H of the detection sensor S2 may be provided (a) in the spacer SP, or alternatively (b) in both the front portion 20 and the spacer SP.

Where the sound path 50 has the above configuration (a), the detection sensor S3 further has one of the following configurations.

Where the transmissive part 30 has the above configuration (6), the central hole 52 of the spacer SP extends from the second hole 21b of the holding hole 21 of the front portion 20 to the opening 211 of the top plate 210 of the case 200 and communicates with the second hole 21b and the opening 211. In this case, the transmissive part 30 is disposed on the Z-direction side relative to the second hole 21b, the central hole 52 of the spacer SP, the opening 211 of the case 200 of the unit U, and the vibratable film 100 of the unit U, and opposed to the vibratable film 100. Where the transmissive part 30 has the above configuration (7), the central hole 52 of the spacer SP extends from the holding hole 21 of the front portion 20 to the opening 211 of the top plate 210 of the case 200 and communicates with the holding hole 21 and the opening 211. In this case, the transmissive part 30 is disposed on the Z-direction side relative to the central hole 52 of the spacer SP, the opening 211 of the case 200 of the unit U, and the vibratable film 100 of the unit U, and opposed to the vibratable film 100. Where the transmissive part 30 has the above configuration (8), the central hole 52 of the spacer SP extends from the transmissive part 30 to the opening 211 of the top plate 210 of the case 200 and communicates with the opening 211. In this case, the transmissive part 30 is disposed on the Z-direction side relative to the central hole 52 of the spacer SP, the opening 211 of the case 200 of the unit U, and the vibratable film 100 of the unit U, and opposed to the vibratable film 100.

The single sound hole or plurality of sound holes 40 of the holder H of the detection sensor S3 have substantially the same configuration as those of the detection sensor S1 and are provided in the portion around the transmissive part 30 of the front portion 20.

The sound path 50 of the holder H of the detection sensor S3 extends from the single sound hole or plurality of sound holes 40 to the opening 211 of the case 200, and communicates with the single sound hole or plurality of sound holes 40 and the opening 211. For example, the sound path 50 may include a single peripheral hole or a plurality of peripheral holes 53, and the central hole 52 (see FIGS. 6A to 6C), or include a single lateral hole or a plurality of lateral holes (not shown), and the central hole 52. The or each peripheral holes 53 extends in the Z-Z' direction through a portion around the central hole 52 of the spacer SP and extends from the or a corresponding sound hole 40 to the central hole 52. The or each lateral hole is provided in the portion around the central hole 52 of the spacer SP, and extends from the or a corresponding sound hole 40 to the central hole 52. Sound waves inputted from the single sound hole or plurality of sound holes 40 pass through the sound path 50 and the opening 211 of the case 200 of the unit U, and vibrate the vibratable film 100.

Where the sound path 50 includes the single peripheral hole or plurality of peripheral holes 53 and the holding portion 10 has the above configuration (1), the single sound hole or plurality of sound holes 40 are opposed to the tubular portion 11 of the holding portion 10 and/or the top plate 210 of the case 200 of the unit U with the single peripheral hole or plurality of peripheral holes 53 existing therebetween, but opposed to neither the opening 211 of the case 200 nor the vibratable film 100 of the unit U. Where the sound path 50 includes the single peripheral hole or plurality of peripheral holes 53 and the holding portion 10 has the above configuration (2) or (3), the single sound hole or plurality of sound holes 40 are opposed to the top plate 210 of the case 200 of the unit U with the single peripheral hole or plurality of peripheral holes 53 existing therebetween, but opposed to neither the opening 211 of the case 200 nor the vibratable film 100 of the unit U. In any of these cases, the vibratable film 100 is not exposed to outside of the holder H through the opening 211 of the case 200, the sound path 50, or the single sound hole or plurality of sound holes 40.

Where the sound path 50 includes the single lateral hole or plurality of lateral holes, the or each of sound hole 40 is opposed to a bottom of the or a corresponding lateral hole of the spacer SP, and thus opposed to neither the opening 211 of the case 200 nor the vibratable film 100 of the unit U.

Where the sound path 50 has the above configuration (b), the detection sensor S3 further has one of the following configurations.

Where the front portion 20 is provided with the holding hole 21 and the holding hole 21 has the above configuration (4), (12) the second hole 21b of the holding hole 21 of the front portion 20 extends from the first hole 21a to the central hole 52 of the spacer SP, and the central hole 52 of the spacer SP extends from the second hole 21b to the opening 211 of the case 200 of the unit U. In this case, the transmissive part 30 is exposed in the Z direction from the first hole 21a of the holding hole 21 of the front portion 20. The transmissive part 30 is exposed in the Z' direction from the second hole 21b of the holding hole 21 of the front portion 20, disposed on the Z-direction side relative to the second hole 21b, the central hole 52, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

Where the front portion 20 is provided with the holding hole 21 and the holding hole 21 has the above configuration (5), (13) the front portion 20 is provided a hole (not shown) in a portion on the Z'-direction side relative to the holding hole 21, the hole extends from the holding hole 21 to the central hole 52 of the spacer SP, and the central hole 52 of the spacer SP extends from the hole to the opening 211 of the case 200 of the unit U. In this case, the transmissive part 30 is exposed in the Z direction from the holding hole 21 of the front portion 20, exposed in the Z' direction from the hole of the front portion 20, and disposed on the Z-direction side relative to the hole, the central hole 52, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

Where the front portion 20 is not provided with the holding hole 21, (14) the front portion 20 is provided with a hole (not shown) extending from the transmissive part 30 to the central hole 52 of the spacer SP, and the central hole 52 of the spacer SP extends from the hole to the opening 211 of the case 200 of the unit U. In this case, the transmissive part 30 is exposed in the Z direction from the front portion 20, exposed in the Z' direction from the hole of the front portion 20, disposed on the Z-direction side relative to the hole, the central hole 52, the opening 211 of the case 200 of the unit U, and the vibratable film 100 of the unit U, and opposed to the vibratable film 100. This arrangement allows infrared rays to transmit from the Z-direction side through the transmissive part 30 and be projected onto the vibratable film 100.

The single sound hole or plurality of sound holes 40 of the holder H of the detection sensor S3 have substantially the same configuration as those of the detection sensor S2 and are provided in the portion around the transmissive part 30 of the front portion 20.

The sound path 50 of the holder H of the detection sensor S3 extends from the single sound hole or plurality of sound holes 40 to the opening 211 of the case 200 and communicates with the single sound hole or plurality of sound holes 40 and the opening 211. For example, the sound path 50 may include a single recess or a plurality of recesses 51 of the front portion 20, one of the second hole 21b of the above configuration (12), the hole of the above configuration (13), or the hole of the above configuration (14) of the front portion 20, and the central hole 52 of the spacer SP. Alternatively, the sound path 50 may include a single lateral hole or a plurality of lateral holes (not shown) of the front portion 20, one of the second hole 21b of the above configuration (12), the hole of the above configuration (13), or the hole of the above configuration (14) of the front portion 20, and the central hole 52 of the spacer SP. The or each of recess 51 is provided in the front portion 20, extends from the or a corresponding sound hole 40 to one of the second hole 21b of the above configuration (12), the hole of the above configuration (13), or the hole of the above configuration (14), also extends in the Z' direction from the sound hole 40 or the corresponding sound hole 40, and is open in the Z' direction. The or each lateral hole is provided in the front portion 20, extends from the or a corresponding sound hole 40 to one of the second hole 21*b* of the above configuration (12), the hole of the above configuration (13), or the hole of the above configuration (14). As described above, the central hole 52 of the spacer SP extends from one of the second hole 21*b* of the above configuration (12), the hole of the above configuration (13), or the hole of the above configuration (14) to the opening 211 of the case 200 of the unit U. Sound waves inputted from the single sound hole or plurality of sound holes 40 pass through the sound path 50 of the front portion 20 and the opening 211 of the case 200 of the unit U and vibrate the vibratable film 100.

Where the sound path 50 includes the single recess or plurality of recesses 51 of the front portion 20, the single sound hole or plurality of sound holes 40 are opposed to the spacer SP with the single recess or plurality of recesses 51 of the front portion 20 existing therebetween, but opposed to neither the opening 211 of the case 200 nor the vibratable film 100 of the unit U. Where the sound path 50 includes the single lateral hole or plurality of lateral holes of the front portion 20, the or each sound hole 40 is opposed to a bottom of the or a corresponding lateral hole of the front portion 20, and thus opposed to neither the opening 211 of the case 200 nor the vibratable film 100 of the unit U. In either case, the vibratable film 100 is not exposed to outside of the holder H through the opening 211 of the case 200, the sound path 50, or the single sound hole or plurality of sound holes 40.

The detection device D of the third embodiment has the same configuration as the detection device D of the first embodiment, except that the detection device D of the third embodiment includes the detection sensor S3 of an aspect described above in place of the detection sensor S1 of an aspect described above.

The detection sensor S3 described above provides at least the following technical features and effects (1) and (2).

Technical Feature and Effect (1): The detection sensor S3 can receive input of infrared rays and input of sound waves from the same direction for the following reasons. The front portion 20 of the holder H is disposed on the Z-direction side relative to the case 200 of the unit U. The transmissive part 30 of the holder H is provided at the front portion 20, exposed from the front portion 20 in the Z and Z' directions, and opposed to the vibratable film 100 with the central hole 52 of the spacer SP and the opening 211 of the case 200 interposed therebetween. As such, the detection sensor S3 allows at least infrared rays to transmit from the Z-direction side through the transmissive part 30 of the holder H and be projected onto the vibratable film 100. Also, the at least one sound hole 40 is provided in the portion around the transmissive part 30 of the front portion 20 of the holder H and is open in the Z direction. The sound path 50 is provided in the spacer SP or in the front portion 20 and the spacer SP, and extends from the at least one sound hole 40 to the opening 211 of the case 200. As such, the detection sensor S3 also allows sound waves to enter into the at least one sound hole 40 from the Z-direction side, to pass through the at least one sound hole 40, the sound path 50, and the opening 211, and to vibrate the vibratable film 100.

Technical Feature and Effect (2): The vibratable film 100 is not exposed to outside of the detection sensor S3 for the following reasons. The transmissive part 30 of the holder H is provided at the front portion 20 and opposed to the vibratable film 100 with the opening 211 of the case 200 interposed therebetween. The at least one sound hole 40 is provided in the portion around the transmissive part 30 of the front portion 20 of the holder H. Accordingly, the vibratable film 100 is not exposed to outside of the detection sensor S3 through the at least one sound hole 40, the sound path 50, or the opening 211. These arrangements reduce the possibility that dirt, etc. enters the detection sensor S3 through the at least one sound hole 40 and the sound path 50 and adheres to the vibratable film 100. In addition, where the cover C is provided, the cover C blocks the at least one sound hole 40, further reducing the possibility that the dirt, etc. enters the detection sensor S3 through the at least one sound hole 40 and the sound path 50 and adheres to the vibratable film 100.

The detection sensor S3 also provides technical features and effects similar to the technical features and effects (3) to (5) of the detection sensor S1.

The detection device D of the second embodiment, which includes the detection sensor S3, also provides technical features and effects similar to those of the detection sensor S3.

It should be appreciated that the detection sensors and connection structures thereof (combinations) are not limited to the embodiments described above but may be modified as appropriate within the scope of the claims. Some examples of modification will now be described. The holding portion 10 of the holder H can be modified in any manner as long as it is configured to hold the unit U of any of the above aspects on the Z'-direction side relative to the front portion 20 of any of the above aspects. The at least one sound hole 40 of the holder H can be modified in any manner as long as it is provided in the portion around the transmissive part 30 of the front portion 20 and is open in the Z direction. The sound path 50 of the holder H can be modified in any manner as long as it extends from the at least one sound hole 40 to the opening 211 of the case 200 of the unit U.

---

Reference Signs List

D: detection device
S1, S2: detection sensor
U: sensor unit
100: vibratable film;
110: film body;
120: first electrode;
130: second electrode
200: case;
210: top plate;
211: opening;
220: tubular portion;
221: locking portion
300: circuit board;
310: electrode
400: field effect transistor
500: conductive ring
600: gate ring
700: holder
H: holder
10: holding portion;
11: tubular portion;
11a: thin portion;
11b: thick portion
20: front portion;
21: holding hole;
21a: first hole;
21b: second hole
30: transmissive part;
31: transmissive part body;
32: peripheral portion
40: sound hole;
50: sound path;
G: gap
60: stop
C: cover
SP: spacer
F1: low-pass filter
F2: high-pass filter -continued Reference Signs List CE: controller

What is claimed is:

1. A detection sensor comprising:
a sensor unit comprising:
    a vibratable film constituted by a piezoelectric film, configured to be irradiated with infrared rays and thereby generate first electric signals through a pyro-electric effect, and configured to be vibrated by sound waves and thereby generate second electric signals through a piezoelectric effect, and
    a case accommodating the vibratable film and including an opening disposed on one side in a first direction relative to the vibratable film, the first direction being a thickness direction of the vibratable film; and
a holder comprising:
    a holding portion holding the sensor unit,
    a front portion disposed on the one side in the first direction relative to the case,
    a transmissive part configured to transmit at least infrared rays, the transmissive part being provided at the front portion, exposed from the front portion to the one side and the other side in the first direction, disposed on the one side in the first direction relative to the opening and the vibratable film, and opposed to the vibratable film,
    a sound hole to input therethrough sound waves, the sound hole being provided in a portion around the transmissive part of the front portion, the sound hole being open to the one side in the first direction, and
    a sound path extending from the sound hole to the opening of the case.

2. The detection sensor according to claim 1, wherein
the front portion is disposed on the one side in the first direction relative to the case with a gap therebetween and opposed to the case,
the sound path includes the gap,
the gap communicates with the opening of the case, and
the sound hole extends through the portion around the transmissive part of the front portion, communicates with the gap, and is opposed to the holding portion and/or a peripheral edge of the opening of the case.

3. The detection sensor according to claim 2, wherein
the holder further comprises at least one stop at the front portion or the holding portion, and
the at least one stop is disposed on the other side in the first direction relative to the front portion and abuts the case from the one side in the first direction.

4. The detection sensor according to claim 3, wherein the holding portion extends from the front portion to the other side in the first direction.

5. The detection sensor according to claim 2, wherein
the case further comprises at least one stop, and
the at least one stop extends from the case to the one side in the first direction and abuts the front portion from the other side in the first direction.

6. The detection sensor according to claim 5, wherein the holding portion extends from the front portion to the other side in the first direction.

7. The detection sensor according to claim 2, wherein the holding portion extends from the front portion to the other side in the first direction.

8. The detection sensor according to claim 2, wherein the holding portion includes a tubular portion, the tubular portion extending from the front portion to the other side in the first direction and fitting over the sensor unit, and
the sound hole is opposed to the tubular portion of the holding portion and/or the peripheral edge of the opening of the case with the sound path existing therebetween.

9. The detection sensor according to claim 1, wherein
the front portion directly abuts the case of the sensor unit from the one side in the first direction, and
the sound path is provided at the front portion.

10. The detection sensor according to claim 9, wherein the holding portion extends from the front portion to the other side in the first direction.

11. The detection sensor according to claim 9, wherein
the sound hole is opposed to the holding portion and/or a peripheral edge of the opening of the case with the sound path existing therebetween.

12. The detection sensor according to claim 11, wherein
the holding portion includes a tubular portion, the tubular portion extending from the front portion to the other side in the first direction and fitting over the sensor unit, and
the sound hole is opposed to the tubular portion of the holding portion and/or the peripheral edge of the opening of the case with the sound path existing therebetween.

13. The detection sensor according to claim 1, wherein
the holder further comprises a spacer interposed between the front portion and the case of the sensor unit,
the spacer is provided with a central hole extending in the first direction through the spacer and being located between the transmissive part and the opening of the case of the sensor unit, and
the sound path is provided at the spacer or alternatively at the front portion and the spacer, and includes the central hole.

14. The detection sensor according to claim 13, wherein the holding portion extends from the front portion to the other side in the first direction.

15. The detection sensor according to claim 13, wherein
the sound hole is opposed to the holding portion and/or a peripheral edge of the opening of the case with the sound path existing therebetween.

16. The detection sensor according to claim 15, wherein
the holding portion includes a tubular portion, the tubular portion extending from the front portion to the other side in the first direction and fitting over the sensor unit, and
the sound hole is opposed to the tubular portion of the holding portion and/or the peripheral edge of the opening of the case with the sound path existing therebetween.

17. The detection sensor according to claim 1, wherein the holding portion extends from the front portion to the other side in the first direction.

18. The detection sensor according to claim 1, wherein the transmissive part includes an optical filter configured to transmit infrared rays in a predetermined wavelength band.

19. The detection sensor according to claim 1, wherein the vibratable film includes:
a film body including a first face on the one side in the first direction and a second face on the other side in the first direction,
a first electrode on the first face of the film body, and
a second electrode on the second face of the film body.

20. The detection sensor according to claim 1, further comprising a cover configured to pass therethrough sound waves, wherein the cover is provided on the portion around the transmissive part of the front portion and blocks the sound hole from the one side in the first direction.

\* \* \* \* \*